United States Patent
Ouyang

(10) Patent No.: US 11,703,677 B2
(45) Date of Patent: Jul. 18, 2023

(54) APERTURE STRUCTURE FOR OPTICAL WINDOWS AND DEVICES

(71) Applicant: CORNING INCORPORATED, Corning, NY (US)

(72) Inventor: Xu Ouyang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 525 days.

(21) Appl. No.: 16/941,808

(22) Filed: Jul. 29, 2020

(65) Prior Publication Data

US 2021/0033846 A1   Feb. 4, 2021

Related U.S. Application Data

(60) Provisional application No. 62/882,101, filed on Aug. 2, 2019.

(51) Int. Cl.
*G02B 26/00* (2006.01)
*G02F 1/1335* (2006.01)
(Continued)

(52) U.S. Cl.
CPC .......... *G02B 26/0833* (2013.01); *B82Y 20/00* (2013.01); *G02B 5/003* (2013.01);
(Continued)

(58) Field of Classification Search
CPC .......... G02F 2201/40; G02F 1/133502; G02F 2201/38; G02F 1/0063; B60J 3/06;
(Continued)

(56) References Cited

U.S. PATENT DOCUMENTS

2009/0219622 A1* 9/2009 Tischler .............. H10K 50/858
                                                            29/428
2013/0208359 A1* 8/2013 Matsuno .............. G02B 26/001
                                                            29/469
(Continued)

FOREIGN PATENT DOCUMENTS

KR      10-1579778 B1    12/2015
MY         155830 A      12/2015

OTHER PUBLICATIONS

NASA, "NASA Develops Super-Black Material That Absorbs Light Across Multiple Wavelength Bands", Available Online at <https://www.nasa.gov/topics/technology/features/super-black-material.html>, Aug. 11, 2011, 3 pages.
(Continued)

*Primary Examiner* — Jonathan Y Jung
(74) *Attorney, Agent, or Firm* — Kevin L. Bray

(57) ABSTRACT

An aperture structure for a substrate for an optical device includes an optical cavity layer, a light absorbing layer, and a blocking layer. The optical cavity layer includes a dielectric material and is characterized by a refractive index of about 1.4 or greater, as measured at a wavelength of 550 nm. The light absorbing layer includes a metal or a metal alloy and is characterized by an extinction coefficient k of at least 1, as measured at a wavelength of 550 nm. The blocking layer includes a metal or a metal alloy and is characterized by an optical density of at least 3 at each wavelength of light in the range from 400 nm to 700 nm. The aperture structure includes a reflectance of less than 5% at each wavelength of light in the range from 400 nm to 700 nm, as measured through the substrate.

20 Claims, 7 Drawing Sheets

(51) Int. Cl.
G02F 1/00 (2006.01)
G02B 26/08 (2006.01)
B82Y 20/00 (2011.01)
G02B 5/00 (2006.01)
B60J 3/06 (2006.01)

(52) U.S. Cl.
CPC ..... G02B 26/001 (2013.01); G02F 1/133502 (2013.01); *B60J 3/06* (2013.01); *G02F 1/0063* (2013.01); *G02F 2201/38* (2013.01); *G02F 2201/40* (2013.01)

(58) Field of Classification Search
CPC .. G02B 5/003; G02B 26/001; G02B 6/29335; G02B 1/116; H01S 5/1021; H01S 5/1042; H01S 5/10
See application file for complete search history.

(56) References Cited

U.S. PATENT DOCUMENTS

| | | | |
|---|---|---|---|
| 2014/0176570 A1* | 6/2014 | Shi | G06T 1/20 438/57 |
| 2015/0355454 A1* | 12/2015 | Ma | G02B 26/001 359/290 |
| 2016/0124119 A1* | 5/2016 | Georges | C03C 17/3644 359/585 |
| 2016/0252770 A1* | 9/2016 | Tonar | G02F 1/133536 349/16 |
| 2017/0059887 A1* | 3/2017 | Park | H01S 5/187 |
| 2018/0081147 A1* | 3/2018 | Olsen | G02B 19/0019 |

OTHER PUBLICATIONS

Texas Instruments, "Overview for Standard Chipsets", Available Online at <https://www.ti.com/dlp-chip/display-and-projection/standard-chipsets/overview.html>, 1995, 4 pages.

Woollam et al., "Overview of Variable Angle Spectroscopic Ellipsometry (VASE), Part I: Basic Theory and Typical Applications" Critical Reviews of Optical Science and Technology, Proc. of SPIE vol. 10294, 1999, pp. 3-28.

\* cited by examiner

APERTURE STRUCTURE FOR OPTICAL WINDOWS AND DEVICES

This application claims priority under 35 USC § 119(e) from U.S. Provisional Patent Application Ser. No. 62/882,101, filed on Aug. 2, 2019, and which is incorporated by reference herein in its entirety.

FIELD

The present disclosure generally relates to aperture structures for optical windows and devices. More specifically, the present disclosure relates to aperture structures exhibiting low reflection and high absorbance of visible light, and which can appear black in color to an observer.

BACKGROUND

Semiconductor-based optical devices, such as such as digital light projection (DLP) or digital micro mirror devices (DMD) packaging, augmented reality, heads-up displays, and charge coupled devices typically include an optical window that includes a region that is highly transparent to light and a surrounding region including an aperture structure configured to minimize device interference due to reflections of incoming light. The characteristics of the aperture structure can vary depending on the intended use of the optical device, but in general, it is desirable for the aperture structure to be characterized by a high absorbance and a low reflectance of light in the working optical range of the optical device (e.g., 400 nm to 700 nm for visible digital light projection). It is also desirable that the aperture structure be capable of being integrated with the substrate of the optical window. In some applications, it may also be desirable to have the aperture structure appear black in color to an observer of the device, preferably from a wide range of viewing angles. Traditional aperture structures may have a low reflectance at certain wavelengths (e.g., 550 nm) with a narrow low reflection band, but have a purplish or reddish hue at larger viewing angles that is undesirable.

In view of these considerations, there is a need for aperture structures for use in optical windows and devices that satisfy the absorbance and reflectance considerations for a particular application and which may appear black in color to an observer.

SUMMARY

According to one aspect of the present disclosure, an aperture structure for a substrate of an optical device is provided. The aperture structure includes an optical cavity layer, a light absorbing layer disposed over the optical cavity layer, and a blocking layer disposed over the light absorbing layer. The optical cavity layer includes a dielectric material that includes at least one of a metal oxide, a metal nitride, and a metal oxynitride and is characterized by a refractive index of about 1.4 or greater, as measured at a wavelength of 550 nm, a transmittance of at least about 50% for each wavelength of light in a range 400 nm to 700 nm at each angle of incidence from 0 degrees to 30 degrees, and a thickness of about 10 nm to about 200 nm. The light absorbing layer includes a metal or a metal alloy and is characterized by an extinction coefficient k of at least 1, as measured at a wavelength of 550 nm, and a thickness of about 3 nm to about 60 nm. The blocking layer includes a metal or a metal alloy and is characterized by an optical density of at least 3 at each wavelength of light in the range from 400 nm to 700 nm, and a thickness of about 30 nm to about 300 nm. The aperture structure includes a reflectance of less than 5% at each wavelength of light in the range from 400 nm to 700 nm at each angle of incidence from 0 degrees to 30 degrees, as measured through the substrate.

According to one aspect of the present disclosure, an optical window includes a glass or glass-ceramic substrate having opposing first and second surfaces and an aperture structure disposed over the first surface of the substrate. The aperture structure includes an optical cavity layer, a light absorbing layer disposed over the optical cavity layer, and a blocking layer disposed over the light absorbing layer. The optical cavity layer includes a dielectric material that includes at least one of a metal oxide, a metal nitride, and a metal oxynitride and is characterized by a refractive index of about 1.4 or greater, as measured at a wavelength of 550 nm, a transmittance of at least about 50% for each wavelength of light in a range from 400 nm to 700 nm at each angle of incidence from 0 degrees to 30 degrees, and a thickness of about 10 nm to about 200 nm. The light absorbing layer includes a metal or a metal alloy and is characterized by an extinction coefficient k of at least 1, as measured at a wavelength of 550 nm, and a thickness of about 3 nm to about 60 nm. The blocking layer includes a metal or a metal alloy and is characterized by an optical density of at least 3 at each wavelength of light in the range from 400 nm to 700 nm, and a thickness of about 30 nm to about 300 nm. The aperture structure includes a reflectance of less than 5% at each wavelength of light in the range from 400 nm to 700 nm at each angle of incidence from 0 degrees to 30 degrees, as measured through the substrate.

According to one aspect of the present disclosure, an optical device includes an optical window, an aperture structure, and a semiconductor disposed over the optical window and the aperture structure. The optical window includes a glass or glass-ceramic substrate having opposing first and second surfaces. The aperture structure is disposed over the first surface of the substrate and includes an optical cavity layer, a light absorbing layer disposed over the optical cavity layer, and a blocking layer disposed over the light absorbing layer. The optical cavity layer includes a dielectric material that includes at least one of a metal oxide, a metal nitride, and a metal oxynitride and is characterized by a refractive index of about 1.4 or greater, as measured at a wavelength of 550 nm, a transmittance of at least about 50% for each wavelength of light in a range from 400 nm to 700 nm at angles of incidence from 0 degrees to 30 degrees, and a thickness of about 10 nm to about 200 nm. The light absorbing layer includes a metal or a metal alloy and is characterized by an extinction coefficient k of at least 1, as measured at a wavelength of 550 nm, and a thickness of about 3 nm to about 60 nm. The blocking layer includes a metal or a metal alloy and is characterized by an optical density of at least 3 at each wavelength of light in the range from 400 nm to 700 nm, and a thickness of about 30 nm to about 300 nm. The aperture structure includes a reflectance of less than 5% at each wavelength of light in the range from 400 nm to 700 nm at each angle of incidence from 0 degrees to 30 degrees, as measured through the substrate. The semiconductor is disposed over the optical window and the aperture structure and the semiconductor and the optical window and the semiconductor define a cavity.

These and other aspects, objects, and features of the present disclosure will be understood and appreciated by those skilled in the art upon studying the following specification, claims, and appended drawings.

DETAILED DESCRIPTION

Figure 1:
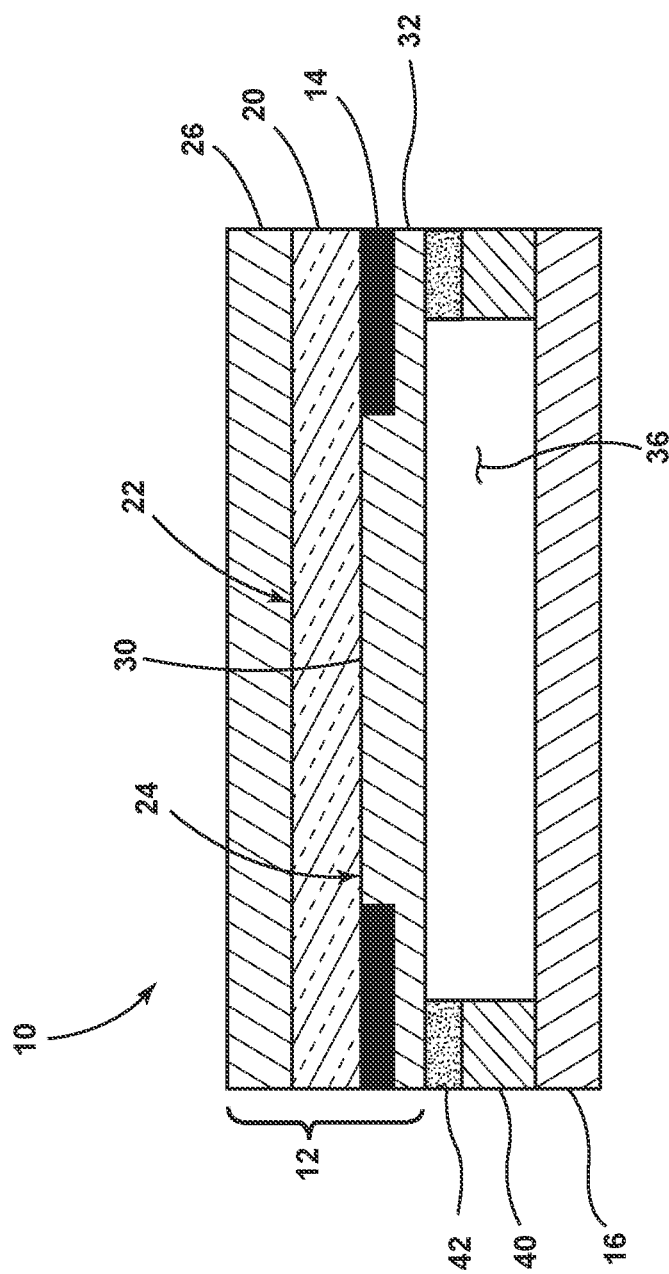
FIG. 1 is a cross-sectional, schematic view of an optical device, according to an aspect of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of melting that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

The thickness and refractive index, and extinction coefficient k of the materials and articles disclosed herein, were determined using variable angle spectroscopic ellipsometry, unless indicated otherwise. Variable angle spectroscopic ellipsometry is based on Maxwell's equations and Fresnel reflection or transmission equations for polarized light, expressed in terms of Psi ($\Psi$) and Delta ($\Delta$) according to Formula (I):

$$\tan(\Psi) \cdot e^{(i\Delta)} = \rho = r_p/r_s \qquad (I)$$

where $r_p$ and $r_s$ are the complex Fresnel reflection coefficients of the sample for p-polarized light (in the plane of incidence) and s-polarized light (perpendicular to the plane of incidence), and where the complex ratio $\rho$ is measured as a function of both wavelength and angle of incidence. Refractive index and extinction coefficient k values reported herein were determined for light having a wavelength of 550 nm, unless otherwise reported. Additional information on variable angle spectroscopic ellipsometry can be found in an "Overview of Variable Angle Spectroscopic Ellipsometry (VASE), Part I: Basic Theory and Typical Applications," *Critical Reviews of Optical Science and Technology*, Volume CR72, page 3-28, 1999. The examples in the present disclosure were analyzed using W-200 spectroscopic ellipsometer from J. A. Woollam. It is understood that other instrumentation and methods, different working optical ranges, and/or different incident angles can also be employed to determine a thickness or an optical characteristic of the materials disclosed herein with any necessary scaling.

The term "disposed" is used herein to refer to a layer or sub-layer that is coated, deposited, formed, or otherwise provided onto a surface. The term disposed can include layers/sub-layers provided in direct contact with adjacent layers/sub-layers or layers/sub-layers separated by intervening material which may or may not form a layer.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Aspects of the present disclosure relate to an aperture structure for an optical device, an optical window including such an aperture structure, and an optical device including an optical window having the aperture structure. The aperture structure includes multiple layers that together decrease reflection of light having a predetermined wavelength in defined areas of an optical window. In some aspects, the aperture structure of the present disclosure exhibits a high absorption to light having a predetermined wavelength. In some aspects, the aperture structure of the present disclosure appears black in color to an observer when viewed from multiple angles.

Figure 2:
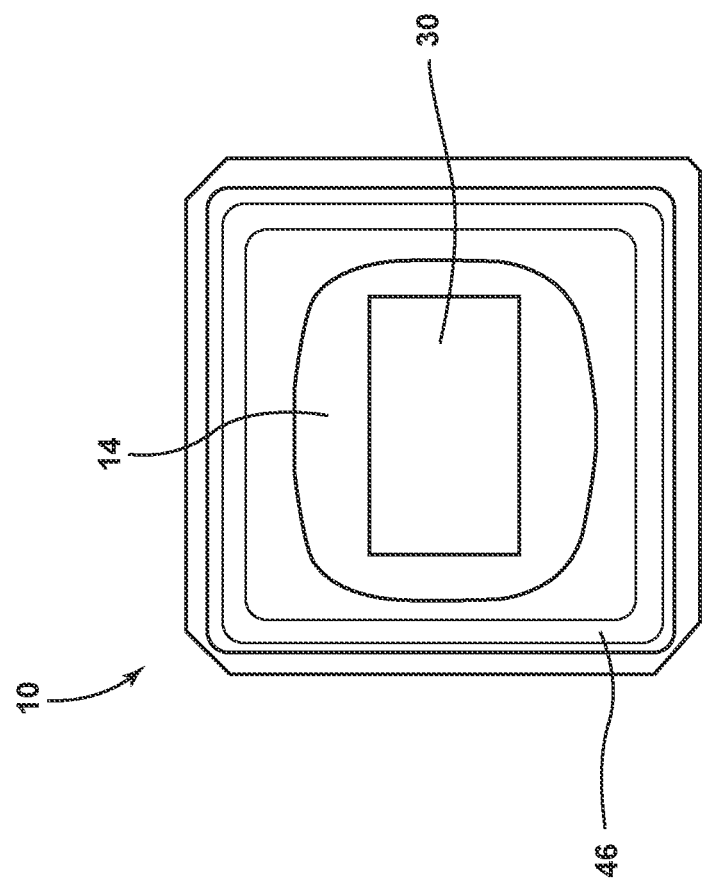
FIG. 2 is a top-down plan view of the optical device of FIG. 1 coupled with an enclosure, according to an aspect of the present disclosure.

Referring to FIGS. 1 and 2, an optical device 10 is illustrated according to an aspect of the present disclosure. The optical device 10 includes an optical window 12, an aperture structure 14, and a semiconductor 16. The optical window 12 includes a substrate 20 that can be made from a glass or glass-ceramic material. The substrate 20 includes a first surface 22 and an opposing second surface 24. A first anti-reflection layer 26 can be disposed over the first surface 22.

The aperture structure 14 can form part of the optical window 12 and can be disposed over the second surface 24 of the substrate 20. The aperture structure 14 can be provided on only a portion of the second surface 24 in a pattern that defines an optical aperture 30. An optional second anti-reflection layer 32 can be disposed over at least a portion of the second surface 24 corresponding to the optical aperture 30, and can form part of the optical window 12. The second anti-reflection layer 32 may overlap with at least a portion of the aperture structure 14 or may be disposed over only the portion of the second surface 24 corresponding to the optical aperture 30.

The semiconductor 16 can be coupled with the optical window 12 in any suitable manner to form a cavity 36. In the example aspect illustrated in FIG. 1, the semiconductor 16 is coupled with the optical window 12 through an interposer 40. The interposer 40 can be coupled with the optical window 12 by any suitable bonding material 42, non-limiting examples of which include an adhesive or a metal bonding material. The bonding material 42 can be an epoxy or a silicone adhesive or a metal bond including gold or indium, for example. The cavity 36 can be configured to house electrical components and other components based on the intended use of the optical device 10. Referring to FIG. 2, the optical device 10 can be housed within an enclosure 46 which may have any suitable shape and may be made from any suitable material based on the intended use of the optical device 10. In one aspect, the enclosure 46 is configured to provide a water and/or air tight seal around the optical window 12, the aperture structure 14, and the semiconductor 16.

According to some aspects of the present disclosure, the substrate 20 includes a glass composition. The substrate 20, for example, can include a chemically strengthened glass, a borosilicate glass, an aluminosilicate glass, soda-lime glass, alkali aluminosilicate glass, germanium glass, alkaline earth boro-aluminosilicate glass, alkali borosilicate glass, calcium fluoride glass, sapphire glass, and magnesium fluoride glass. The substrate 20 may have a selected length and width, or diameter, to define its surface area. The substrate 20 may have at least one edge between the first surface 22 and second surface 24 of the substrate 20 defined by its length and width, or diameter. The substrate 20 may also have a selected thickness. In some aspects, the substrate 20 has a thickness of from about 0.2 mm to about 1.5 mm, from about 0.2 mm to about 1.3 mm, from about 0.2 mm to about 1.0 mm, from about 0.1 mm to about 1.5 mm, from about 0.1 mm to about 1.3 mm, or from about 0.1 mm to about 1.0 mm.

In some aspects of the present disclosure, the substrate 20 includes a glass-ceramic material having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite. "Glass-ceramics" include materials produced through controlled crystallization of glass. In some aspects, the glass-ceramics have about 30% to about 90% crystallinity (by weight). Examples of suitable glass-ceramics may include $Li_2O$—$Al_2O_3$—$SiO_2$ system (i.e., LAS-System) glass-ceramics, $MgO$—$Al_2O_3$—$SiO_2$ system (i.e., MAS-System) glass-ceramics, $ZnO \times Al_2O_3 \times nSiO_2$ (i.e., ZAS system), and/or glass-ceramics that include a predominant crystal phase including β-quartz solid solution, β-spodumene, cordierite, and lithium disilicate. The glass-ceramic substrates may be strengthened using a chemical strengthening process. The substrate 20 may be an amorphous or polycrystalline ceramic.

The first anti-reflection layer 26 and/or the second anti-reflection layer 32 includes at least one layer of at least one material configured to provide anti-reflection properties over a desired working optical range based on the intended use of the optical device 10. The first anti-reflection layer 26 and the second anti-reflection layer 32 can be the same or different. The first anti-reflection layer 26 and/or the second anti-reflection layer 32 can include at least one of magnesium fluoride ($MgF_2$), tantalum pentoxide ($Ta_2O_5$), zirconium oxide (ZrO), aluminum trioxide ($Al_2O_3$), silicon dioxide ($SiO_2$), and combinations thereof. In one aspect, the first anti-reflection layer 26 and/or the second anti-reflection layer 32 include a plurality of sub-layers, with each sub-layer including at least one of magnesium fluoride ($MgF_2$), tantalum pentoxide ($Ta_2O_5$), zirconium oxide (ZrO), aluminum trioxide ($Al_2O_3$), silicon dioxide ($SiO_2$), and combinations thereof. In one aspect, the first anti-reflection layer 26 and/or the second anti-reflection layer 32 include a plurality of sub-layers deposited on a substrate in the following order: $Ta_2O_5$, $SiO_2$, $Ta_2O_5$, $ZrO_2$, and $MgF_2$. In one aspect, the first anti-reflection layer 26 and/or the second anti-reflection layer 32 include a plurality of sub-layers deposited on a substrate in the following order: $Ta_2O_5$, $SiO_2$, $Ta_2O_5$, $Al_2O_3$, and $MgF_2$. The term "layer" as used herein may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by a discrete deposition process or a continuous deposition process. In one or more embodiments, the layer may be formed using only continuous deposition processes, or, alternatively, only discrete deposition processes.

In some aspects, the first anti-reflection layer 26 and/or the second anti-reflection layer 32 can include one or more low refractive index sub-layers and one or more high refractive index sub-layers, alternating in their sequencing relative to one another. As used herein, the terms "index" and "refractive index" both refer to the real part of the refractive index of the material, determined as discussed above at a wavelength of 550 nm using variable angle spectroscopic ellipsometry. As used herein, RI refers to refractive index and the terms "low RI", "high RI" and "medium RI" refer to RI values relative to another RI value (e.g., low RI<medium RI<high RI). According to one aspect, the term "low RI," when used with a low RI layer or sub-layer, can include an RI value of less than about 1.5, for light having a wavelength of 550 nm. The term "high RI," when used with a high RI layer or sub-layer, can include a value of at least about 1.7, as measured at a wavelength of 550 nm. The term "medium RI," when used with a medium RI layer or sub-layer, can include a value of about 1.5 to about 1.7, as measured at a wavelength of 550 nm. The ranges for low RI, high RI, and medium RI may overlap, however in each scenario, the relative relationship regarding the RI of each layer or sub-layer is based on the following relationship: low RI<medium RI<high RI. In one aspect, the sub-layers of the first anti-reflection layer 26 and/or second anti-reflection layer 32 may form an anti-reflection stack in the form of pairs of alternating high RI and low RI materials repeated n number of times (high RI/low RI)$^n$ or (low RI/high RI)$^n$, where n is 1 to 10, 2 to 10, 3 to 10, 4 to 10, 5 to 10, 1 to 5, 2 to 5, or 3 to 5. For example, the first anti-reflection layer 26 and/or the second anti-reflection layer 32 can include pairs of alternating high RI and low RI materials repeated n number of times (high RI/low RI)$^n$ or (low RI/high RI)$^n$, where n is 1, 2, 3, 4, 5, 6, 7, 8, 9, or 10. Examples of high RI materials include $TiO_2$ and $Ta_2O_5$. Examples of low RI materials include $SiO_2$, $MgF_2$, and $Al_2O_3$.

The first anti-reflection layer 26 and/or the second anti-reflection layer 32 can have a thickness of about 500 nm or less. In some aspects, the first anti-reflection layer 26 and/or the second anti-reflection layer 32 have a thickness of about 100 nm to about 500 nm, about 100 nm to about 400 nm, about 100 nm to about 300 nm, about 100 nm to about 200 nm, about 200 nm to about 500 nm, about 200 nm to about 400 nm, about 200 nm to about 300 nm, about 300 nm to about 500 nm, about 300 nm to about 400 nm, or about 400 nm to about 500 nm.

The first anti-reflection layer 26 and/or the second anti-reflection layer 32 can be characterized by a reflectance value of about 2% or less, about 1.5% or less, about 1% or less, about 0.75% or less, about 0.5% or less, about 0.25% or less, about 0.1% or less, or about 0.05% or less at each wavelength over a working optical range of 400 nm to 700 nm at each angle of incidence from normal to 30 degrees. In some aspects, the first anti-reflection layer 26 and/or the second anti-reflection layer 32 exhibit a reflectance value of about 0 to about 2%, about 0 to about 1.5%, about 0% to about 1%, about 0 to about 0.75%, about 0 to about 0.5%, about 0.05% to about 2%, about 0.05% to about 1.5%, about 0.05% to about 1%, about 0.05% to about 0.75%, about 0.05% to about 0.5%, or about 0.1% to about 0.05%, at each wavelength over a working optical range of 400 nm to 700 nm. For example, the first anti-reflection layer 26 and/or the second anti-reflection layer 32 can exhibit a light reflectance of about 2%, about 1.75%, about 1.5%, about 1.25%, about 1%, about 0.5%, about 0.25%, about 0.1%, or about 0.05%, or any reflectance value between these values at each wavelength over a working optical range of 400 nm to 700 nm each angle of incidence from normal to 30 degrees. The reflectance values of the first anti-reflection layer 26 and/or the second anti-reflection layer 32 were measured using a Perkin-Elmer Lambda 950 UV/Vis Spectrophotometer at each angle of incidence from normal to 30 degrees for each wavelength in the range of 400 nm to 700 nm. It is understood that other instrumentation and methods, different working optical ranges, and/or different incident angles can also be employed to determine the reflectance of the materials disclosed herein with any necessary scaling.

The first anti-reflection layer 26 and second anti-reflection layer 32 can be deposited using a variety of methods including physical vapor deposition ("PVD"), electron beam deposition ("e-beam" or "EB"), ion-assisted deposition-EB ("IAD-EB"), laser ablation, vacuum arc deposition, sputtering, plasma enhanced chemical vapor deposition (PECVD), and other similar deposition techniques.

Figure 3B:
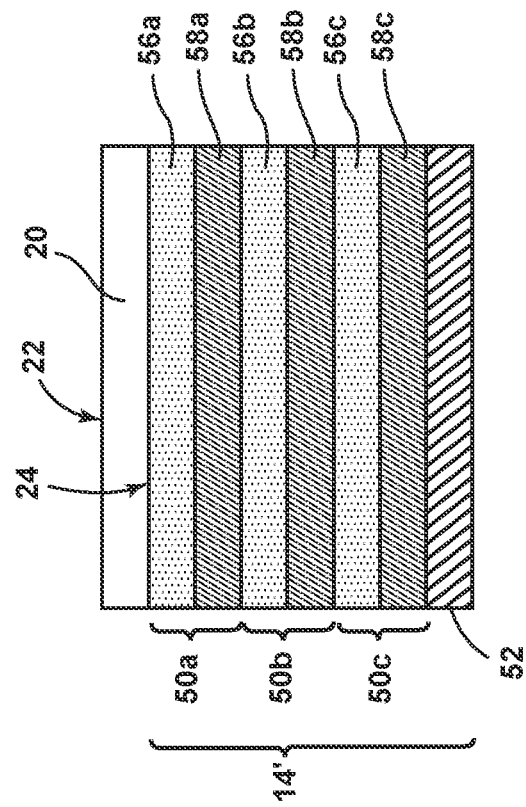
FIG. 3B is a cross-sectional, schematic view of an aperture structure, according to an aspect of the present disclosure.
Figure 3A:
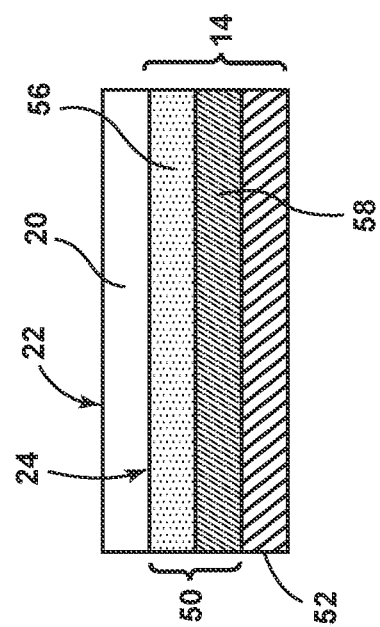
FIG. 3A is a cross-sectional, schematic view of an aperture structure, according to an aspect of the present disclosure.

Referring to FIG. 3A, the aperture structure 14 includes an optical stack 50 and a blocking layer 52. As used herein, "optical stack" refers to a series of two or more layers differing in composition, consecutive ones of which are in direct contact with each other. In a preferred embodiment, an optical stack includes an optical cavity layer in direct contact with a light absorbing layer. In another preferred embodiment, the aperture structure 14 includes multiple periods of an optical stack, wherein each period of the multiple periods includes an optical cavity layer in direct contact with a light absorbing layer, and where consecutive periods of the multiple periods are in direct contact. The optical stack 50 is disposed over the second surface 24 of the substrate 20 and the blocking layer 52 is disposed over an exposed surface of the optical stack 50. The optical stack 50 may be applied directly on the second surface 24 or one or more intervening adhesive layers and/or refractive index matching layers may be disposed between the second surface 24 and the optical stack 50. The optional adhesive layer(s) may facilitate bonding of the aperture structure 14 to the substrate 20. Non-limiting examples of suitable adhesive layer material includes chromium metal, nickel metal, nickel-chromium metal alloys, and aluminum trioxide. The optional adhesive layer(s) can have a thickness of about 3 nm to about 30 nm, about 3 nm to about 20 nm, about 3 nm to about 10 nm, about 10 nm to about 30 nm, about 10 nm to about 20 nm, or about 20 nm to about 30 nm.

The optional refractive index matching layers can be selected to provide an incremental refractive index change between the substrate 20 and the optical stack 50 to reduce reflection. Without being limited by any theory, as the difference between the refractive index of two adjacent materials decreases, the amount of reflection exhibited by light when passing from one material to the next also decreases. As the difference in refractive indices approaches 0, the amount of reflection also approaches 0. Thus, in some aspects, based on the refractive index of the substrate 20 and the refractive index of the optical stack 50, one or more refractive index matching layers can be provided between the optical stack 50 and the substrate 20 to incrementally change the refractive index encountered by a light ray traveling between the substrate 20 and the optical stack 50.

The optical stack 50 includes an optical cavity layer 56 and a light absorbing layer 58 disposed over the optical cavity layer 56. The optical cavity layer 56 can include a dielectric material that includes a metal oxide, a metal nitride, a metal oxynitride, or combinations thereof. The dielectric material can be selected to provide little to no absorbance of light within a desired optical range, such as 400 nm to 700 nm. The dielectric material of the optical cavity layer 56 can include $SiO_2$, $Al_2O_3$, $Nb_2O_5$, $TiO_2$, $ZrO_2$, $Ta_2O_5$, $Y_2O_3$, $Si_3N_4$, SiON, $TiO_x$ (where 0<x<2), $SiN_x$ (where 0<x<(4/3)), $SiO_xN_y$ (wherein x+y<2), $CrO_x$ (where x<(3/2)), and combinations thereof. The foregoing compositions for the optical cavity layer 56 exclude a combination of subscripts that would result in a pure elemental form (e.g., pure silicon, pure chromium, or pure titanium). In addition, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). According to one aspect, the selection of a stoichiometric or non-stoichiometric dielectric material can be based at least in part on a desired degree of absorption of light having a wavelength of from 400 nm to 700 nm to aid in providing the aperture structure 14 with the desired characteristics. For example, one or more of the optical cavity layers 56 can include $TiO_2$, which is characterized by minimal absorption of light having a wavelength in the range of 400 nm to 700 nm. Generally, a more metallic dielectric material, i.e., a dielectric material that is not completely oxidized, will have a higher absorbance for light of a particular wavelength than the corresponding dielectric material that is oxidized to a greater extent. Thus, in some examples in which a higher amount of absorption to light having a wavelength in the range of 400 nm to 700 nm is desired, $TiO_x$ (where 0≤x≤2) can be utilized rather than the stoichiometric $TiO_2$ dielectric material. In this manner, the dielectric material of the optical cavity layer 56 can be selected based on a desired degree of absorption to light within a particular wavelength range in combination with the material of the light absorbing layer 58 and the blocking layer 52 to provide the aperture structure with the desired reflectance characteristics.

The optical cavity layer 56 can be characterized by a refractive index of about 1.4 or greater, as measured at a wavelength of 550 nm. As discussed above, the refractive index of the materials disclosed herein are based on incident light having a wavelength of 550 nm and determined using variable angle spectroscopic ellipsometry. In some aspects, the optical cavity layer 56 can be characterized by a refractive index of about 1.4 or greater, about 1.5 or greater, about 1.6 or greater, about 1.7 or greater, about 1.8 or greater, about 1.9 or greater, about 2.0 or greater, about 2.1 or greater, about 2.2 or greater, about 2.3 or greater, about 2.4 or greater, about 2.5 or greater, about 2.6 or greater, about 2.7 or greater, about 2.8 or greater, or about 2.9 or greater, as measured at a wavelength of 550 nm. In some aspects, the optical cavity layer 56 can be characterized by a refractive index of about 1.8 to about 3.0, about 1.9 to about 3.0, about 2.0 to about 3.0, about 2.1 to about 3.0, about 2.2 to about 3.0, about 2.3 to about 3.0, about 2.4 to about 3.0, about 2.5 to about 3.0, about 2.6 to about 3.0, about 2.7 to about 3.0, about 2.8 to about 3.0, about 1.8 to about 2.5, about 1.8 to about 2.2, about 1.8 to about 2.0, about 2.0 to about 3.0, or about 2.0 to about 2.5, as measured at a wavelength of 550 nm. For example, the optical cavity layer 56 can be characterized by a refractive index of about 1.4, about 1.46, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, or any refractive index value between these values, as measured at a wavelength of 550 nm.

The optical cavity layer 56 can have a transmittance of at least about 50% to light having a for each wavelength in a range from 400 nm to 700 nm at at least one layer thickness in the range from about 10 nm to 200 nm. In some aspects, the optical cavity layer 56 can be characterized by a transmittance of at least about 50%, at least about 60%, at least about 70%, at least about 80%, or at least about 90% for each wavelength of light in a range from 400 nm to 700 nm. For example, the optical cavity layer 56 can be characterized by a transmittance of about 50%, about 55%, about 60%, about 65%, about 70%, about 75%, about 80%, about 85%, about 90%, about 95%, about 96%, about 97%, about 98%, or about 99%, for each wavelength of light in a range from 400 nm to 700 nm at each angle of incidence from 0 degrees to 30 degrees, or any transmittance value between these values. In some examples, the optical cavity layer 56 can have a transmittance per unit thickness at each wavelength of light in a range from 400 nm to 700 nm at each angle of incidence from 0 degrees to 30 degrees of at least about 0.25%/nm, at least about 0.275%/nm, at least about 0.3%/nm, at least about 0.325%/nm, at least about 0.35%/nm, at least about 0.375%/nm, at least about 0.4%/nm, at least about 0.425%/nm, at least about 0.45%/nm, at least about 0.475%/nm, or any transmittance value between these values. Transmittance values for the optical cavity layer 56 reported herein were measured at incident angles from normal (0 degrees) to 30 degrees at each wavelength in the range from 400 nm to 700 nm. Transmittance can be determined using an optical spectrometer, such as a Cary-7000 Universal Measurement Spectrophotometer from Agilent Technologies, Inc. It is understood that other instrumentation and methods, different working optical ranges, and/or different incident angles can also be employed to determine the transmittance of the optical cavity layer 56 disclosed herein with any necessary scaling.

The optical cavity layer 56 can have a thickness of from about 10 nm to about 200 nm. For example, the optical cavity layer 56 can have a thickness of from about 10 nm to about 200 nm, about 10 nm to about 180 nm, about 10 nm to about 160 nm, about 10 nm to about 160 nm, about 10 nm to about 140 nm, about 10 nm to about 120 nm, about 10 nm to about 100 nm, about 10 nm to about 90 nm, about 10 nm to about 80 nm, about 10 nm to about 70 nm, about 10 nm to about 60 nm, about 10 nm to about 50 nm, about 10 nm to about 40 nm, about 10 nm to about 30 nm, about 10 nm to about 20 nm, about 20 nm to about 200 nm, about 20 nm to about 180 nm, about 20 nm to about 160 nm, about 20 nm to about 160 nm, about 20 nm to about 140 nm, about 20 nm to about 120 nm, about 20 nm to about 100 nm, about 20 nm to about 90 nm, about 20 nm to about 80 nm, about 20 nm to about 70 nm, about 20 nm to about 60 nm, about 20 nm to about 50 nm, about 20 nm to about 40 nm, about 20 nm to about 30 nm, about 30 nm to about 200 nm, about 30 nm to about 180 nm, about 30 nm to about 160 nm, about 30 nm to about 160 nm, about 30 nm to about 140 nm, about 30 nm to about 120 nm, about 30 nm to about 100 nm, about 30 nm to about 90 nm, about 30 nm to about 80 nm, about 30 nm to about 70 nm, about 30 nm to about 60 nm, about 30 nm to about 50 nm, about 30 nm to about 40 nm, about 40 nm to about 200 nm, about 40 nm to about 180 nm, about 40 nm to about 160 nm, about 40 nm to about 160 nm, about 40 nm to about 140 nm, about 40 nm to about 120 nm, about 40 nm to about 100 nm, about 40 nm to about 90 nm, about 40 nm to about 80 nm, about 40 nm to about 70 nm, about 40 nm to about 60 nm, about 40 nm to about 50 nm, about 50 nm to about 200 nm, about 50 nm to about 180 nm, about 50 nm to about 160 nm, about 50 nm to about 160 nm, about 50 nm to about 140 nm, about 50 nm to about 120 nm, about 50 nm to about 100 nm, about 50 nm to about 90 nm, about 50 nm to about 80 nm, about 50 nm to about 70 nm, about 50 nm to about 60 nm, about 60 nm to about 200 nm, about 60 nm to about 180 nm, about 60 nm to about 160 nm, about 60 nm to about 160 nm, about 60 nm to about 140 nm, about 60 nm to about 120 nm, about 60 nm to about 100 nm, about 60 nm to about 90 nm, about 60 nm to about 80 nm, about 70 nm to about 80 nm, about 70 nm to about 200 nm, about 70 nm to about 180 nm, about 70 nm to about 160 nm, about 70 nm to about 160 nm, about 70 nm to about 140 nm, about 70 nm to about 120 nm, about 70 nm to about 100 nm, about 70 nm to about 90 nm, about 90 nm to about 200 nm, about 90 nm to about 80 nm, about 90 nm to about 180 nm, about 90 nm to about 160 nm, about 90 nm to about 160 nm, about 90 nm to about 140 nm, about 90 nm to about 120 nm, about 90 nm to about 100 nm, about 100 nm to about 200 nm, about 100 nm to about 180 nm, about 100 nm to about 160 nm, about 100 nm to about 160 nm, about 100 nm to about 140 nm, about 100 nm to about 120 nm, about 120 nm to about 200 nm, about 120 nm to about 180 nm, about 120 nm to about 160 nm, about 120 nm to about 160 nm, about 120 nm to about 140 nm, about 140 nm to about 200 nm, about 140 nm to about 180 nm, about 140 nm to about 160 nm, about 160 nm to about 200 nm, about 160 nm to about 180 nm, or about 180 nm to about 200 nm. For example, the optical cavity layer 56 can have a thickness of about 10 nm, about 20 nm, about 30 nm, about 33 nm, about 38 nm, about 40 nm, about 50 nm, about 60 nm, about 70 nm, about 80 nm, about 90 nm, about 100 nm, about 110 nm, about 120 nm, about 140 nm, about 160 nm, about 180 nm, about 120 nm, or any thickness values between these values.

The light absorbing layer 58 can include a metal or a metal alloy and have a thickness of about 3 nm to about 60 nm. The metal or metal alloy of the light absorbing layer 58 can include chromium metal, nickel metal, tungsten metal, and a nickel-chromium metal alloy. In some aspects, the light absorbing layer 58 includes a nickel-chromium alloy, such as Inconel, that includes greater than 40% by weight (wt %) nickel, greater than 50 wt % nickel, greater than 60 wt % nickel, or greater than 70 wt % nickel. For example, the light absorbing layer 58 can include Inconel 400, Inconel 500, Inconel 600, or Inconel 700, which corresponds to 40%, 50%, 60%, and 70% nickel (by weight), respectively. In some aspect, the nickel-chromium alloy includes nickel as the dominant component of the nickel-chromium alloy and chromium as the second dominant component. In some aspects, the light absorbing layer 58 has a thickness of from about 3 nm to about 60 nm, about 3 nm to about 50 nm, about 3 nm to about 40 nm, about 3 nm to about 30 nm, about 3 nm to about 20 nm, about 10 nm to about 60 nm, about 10 nm to about 50 nm, about 10 nm to about 40 nm, about 10 nm to about 30 nm, about 10 nm to about 20 nm, about 15 nm to about 60 nm, about 15 nm to about 50 nm, about 15 nm to about 40 nm, about 15 nm to about 30 nm, about 15 nm to about 20 nm, about 20 nm to about 60 nm, about 20 nm to about 50 nm, about 20 nm to about 40 nm, about 20 nm to about 30 nm, about 30 nm to about 60 nm, about 30 nm to about 50 nm, about 30 nm to about 40 nm, about 40 nm to about 60 nm, about 40 nm to about 50 nm, or about 50 nm to about 60 nm. For example, the light absorbing layer 58 can have a thickness of about 3 nm, about 5 nm, about 10 nm, about 15 nm, about 18 nm, about 20 nm, about 25 nm, about 30 nm, about 35 nm, about 40 nm, about 45 nm, about 50 nm, about 55 nm, about 60 nm, or any thickness value between these values.

The light absorbing layer 58 can include an extinction coefficient k of at least 1, as measured at a wavelength of 550 nm. As used herein, the extinction coefficient k represents the imaginary component of the complex refractive index that is directly related to the amount of light absorbed in the material. In some aspects, the light absorbing layer 58 includes an extinction coefficient k of at least 1.1, at least 1.2, at least 1.3, at least 1.4, at least 1.5, at least 1.6, at least 1.7, at least 1.8, at least 1.9, at least 2, at least 2.1, at least 2.2, at least 2.3, at least 2.4, at least 2.5, at least 2.6, at least 2.7, at least 2.8, at least 2.9, or at least 3, as measured at a wavelength of 550 nm. In some aspects, the light absorbing layer 58 includes an extinction coefficient k of about 1 to about 3, about 1 to about 2, about 1 to about 1.5, about 2 to about 3, or about 2.5 to about 3. For example, the light absorbing layer 58 can include an extinction coefficient k of about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, or any extinction coefficient value between these values.

The aperture structure 14 can include a blocking layer 52 disposed over the light absorbing layer 58 that includes a metal or metal alloy. The metal or metal alloy of the blocking layer 52 can include chromium metal, nickel metal, tungsten metal, and a nickel-chromium metal alloy. In some aspects, the blocking layer 52 includes a nickel-chromium alloy, such as Inconel, that includes greater than 40% by weight (wt %) nickel, greater than 50 wt % nickel, greater than 60 wt % nickel, or greater than 70 wt % nickel. In some aspect, the nickel-chromium alloy includes nickel as the dominant component of the nickel-chromium alloy and chromium as the second dominant component of blocking layer 52. The composition of blocking layer 52 may be the same as or different from the composition of light absorbing layer 58. In some aspects, a layer of a single composition includes a sublayer having a thickness consistent with the light absorbing layer 58 described herein in direct contact with a sublayer having a thickness consistent with the blocking layer 52 described herein. In some aspects, the last light absorbing layer 58 (i.e., the light absorbing layer 58 furthest from the glass substrate) has a thickness sufficient to provide both the desired characteristics of the light absorbing layer, such as an extinction coefficient k of at least 1, as measured at a wavelength of 550 nm, and the desired characteristics of the blocking layer, such as an optical density of at least 3 at each wavelength of light in the range from 400 nm to 700 nm.

The blocking layer 52 is disposed on optical stack 50 and can have a thickness of about 30 nm to about 300 nm. In some aspects, the blocking layer 52 has a thickness of about 30 nm to about 300 nm, about 30 nm to about 250 nm, about 30 nm to about 200 nm, about 30 nm to about 150 nm, about 30 nm to about 100 nm, about 50 nm to about 300 nm, about 50 nm to about 250 nm, about 50 nm to about 200 nm, about 50 nm to about 150 nm, about 50 nm to about 100 nm, about 100 nm to about 300 nm, about 100 nm to about 250 nm, about 100 nm to about 200 nm, about 100 nm to about 150 nm, about 150 nm to about 300 nm, about 150 nm to about 250 nm, about 150 nm to about 200 nm, about 200 nm to about 300 nm, about 200 nm to about 250 nm, or about 250 nm to about 300 nm. For example, the blocking layer 52 can have a thickness of about 50 nm, about 75 nm, about 80 nm, about 100 nm, about 125 nm, about 150 nm, about 175 nm, about 200 nm, about 225 nm, about 250 nm, about 300 nm, or a thickness value between any of these values.

The blocking layer 52 can have an optical density (OD) of at least 3, where optical density (OD) is defined as:

$$OD = 1/\log_{10}(\% \ T)$$

where % T is the percent transmittance of light. Thus, a material with a 10% transmission has an OD of 1, a 1% transmission corresponds to an OD of 2, a 0.1% transmission corresponds to an OD of 3, and a 0.01% transmission corresponds to an OD of 4. Unless indicated otherwise, the OD of the blocking layer 52 is determined by measuring the transmittance of the blocking layer 52 at 550 nm and an angle of incidence of 0 degrees. In some aspects, the OD of the blocking layer 52 is at least 3.1, at least 3.2, at least 3.3, at least 3.4, at least 3.5, at least 3.6, at least 3.7, at least 3.8, at least 3.9, or at least 4, at each wavelength within a working optical range of 400 nm to 700 nm. In some aspects, the OD of the blocking layer 52 is about 3 to about 5, about 3 to about 4, about 3.5 to about 5, about 3.5 to about 4, or about 4 to about 5, at each wavelength within a working optical range of 400 nm to 700 nm. For example, the OD of the blocking layer 52 can be about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, or any value between these values, based on transmittance of the material as measured at 550 nm and an angle of incidence of 0 degrees. Transmittance can be determined using an optical spectrometer, such as a Cary-7000 Universal Measurement Spectrophotometer from Agilent Technologies, Inc. It is understood that other instrumentation and methods, different working optical ranges, and/or different incident angles can also be employed to determine the transmittance and optical density of the blocking layer 52 disclosed herein with any necessary scaling.

FIG. 3B illustrates an aperture structure 14' that is similar to the aperture structure 14 of FIG. 3A, except that the aperture structure 14' includes multiple optical stacks 50a-c. Each optical stack 50a-c includes an optical cavity layer in direct contact with a light absorbing layer (56a/58a, 56b/58b, 56c/58c) with the optical stack 50a in direct contact with the optical stack 50b and the optical stack 50b is in direct contact with the optical stack 50c. As such, like numbered elements in FIGS. 3A and 3B have the same or substantially similar functions and structures, unless otherwise specified. Whereas aperture structure 14 of FIG. 3A includes a single optical stack 50, the aperture 14' of FIG. 3B includes multiple optical stacks 50, with each of the multiple optical stacks 50 identified using the suffix "a", "b", "c". Thus, each individual optical stack 50 of the aperture structure 14' is identified with the label 50a, 50b, and 50c. Each optical stack 50a, 50b, and 50c is similar to the optical stack 50 described above with respect to FIG. 3A and each optical stack 50a, 50b, and 50c can be the same or different than the other of the optical stacks 50a, 50b, and 50c. The aperture structure 14' can include multiple optical stacks 50a-c, with each optical stack 50a-c including a pair of adjacent optical cavity layers 56 and light absorbing layers 58, identified individually as 56a and 58a, 56b, and 58b, and 56c and 58c, respectively. The suffix "a", "b", and "c" is used with respect to the optical cavity layers 56 and the light absorbing layers 58 to identify each of the optical cavity layers 56 and each of the light absorbing layers 58 corresponding to each of the optical stacks 50a, 50b, and 50c, respectively. Each optical cavity layer 56a, 56b, and 56c is similar to the optical cavity layer 56 described above with respect to FIG. 3A and each optical cavity layer 56a, 56b, and 56c can be the same or different than the other of the optical cavity layers 56a, 56b, and 56c. The optical cavity layers 56a, 56b, and 56c can have the same or different thickness. Each of the light absorbing layers 58a, 58b, and 58c is similar to the light absorbing layer 58 described above with respect to FIG. 3A and each light absorbing layer 58a, 58b, and 58c can be the same or different than the other of the light absorbing layers 58a, 58b, and 58c. The light absorbing layers 58a, 58b, and 58c can have the same or different thickness. The first optical stack 50a can be disposed over the substrate 20 with the first optical cavity layer 56a disposed over the substrate 20 and the first light absorbing layer 58a disposed over the first optical cavity layer 56a. One or more additional layers may be disposed between the substrate 20 and the first optical stack 50a, in a manner similar to that described above with respect to the optical stack 50 of FIG. 3A. The second optical stack 50b can be disposed over the first optical stack 50a with the second optical cavity layer 56b disposed over the first light absorbing layer 58a of the first optical stack 50a and the second light absorbing layer 58b disposed over the second optical cavity layer 56b. The third optical stack 50c can be disposed over the second optical stack 50b with the third optical cavity layer 56c disposed over the second light absorbing layer 58b and the third light absorbing layer 58c disposed over the third optical cavity layer 56c. This alternating pattern of optical cavity layers and light absorbing layers can be repeated n number of times to form n number of optical stacks. The blocking layer 52 can be disposed over the last optical stack 50c, where "last" refers to the optical stack furthest from substrate 20.

The optical cavity layers 56a-c in each of the optical stacks 50a-c, respectively, may have the same or different characteristics, including characteristics such as materials, refractive index, thickness, and transmittance. The light absorbing layers 58a-c in each of the optical stacks 50a-c, respectively, may have the same or different characteristics, including characteristics such as materials, extinction coefficient, and thickness. While the aperture structure 14' is illustrated as having 3 optical stacks 50a-c, it is within the scope of the aperture structure 14' to include fewer or more optical stacks 50. In one aspect, the aperture structure 14' can include n number of optical stacks 50, where n is from 1 to 10, from 2 to 10, from 3 to 10, from 4 to 10, from 5 to 10, from 6 to 10, from 7 to 10, from 8 to 10, from 9 to 10, from 1 to 5, from 1 to 4, from 1 to 3, or from 1 to 2. For example, the aperture structure 14' can include n number of optical stacks 50, where n is 1, 2, 3, 4, 5, 6, 7, 8, 9, 10 or any value between these values.

Without being bound by any particular theory, the optical stack 50 may affect the absorbance and reflectance properties of the aperture structure 14 through destructive interference. As light travels through the optical cavity layer 56 and the light absorbing layer 58 of each optical stack 50, reflections may occur at the interfaces between the optical cavity layer 56 and the light absorbing layer 58 which can result in a phase shift of the reflected light, resulting in destructive interference of at least a portion of the reflected light and eventual absorbance of at least a portion of the remaining reflected and/or transmitted light by the blocking layer 52.

The aperture structure 14 can be characterized by a reflectance value of less than 5% at each wavelength of light within a working optical range of 400 nm to 700 nm, at each angle of incidence from 0 degrees to 30 degrees. In some aspects, the reflectance of the aperture structure 14 is less than 5%, less than 4%, less than 3%, less than 2%, less than 1%, or less than 0.5% at each wavelength of light within a working optical range of 400 nm to 700 nm, at each angle of incidence from 0 degrees to 30 degrees. The aperture structure 14 can be characterized by an absorbance value of 98% or greater to light at each wavelength within a working optical range of 400 nm to 700 nm, at each angle of incidence from 0 degrees to 30 degrees. In some aspects, the absorbance is greater than 98.5%, greater than 99%, or greater than 99.5%, at each wavelength of light within a working optical range of 400 nm to 700 nm, at each angle of incidence from 0 degrees to 30 degrees. The reflectance and transmittance values of the aperture structure 14 are measured with the aperture structure disposed on a glass substrate, wherein the glass substrate has an extinction coefficient k of 0 at each wavelength of light within the working optical range of 400 nm to 700 nm (i.e., no absorption of light by the glass substrate at each wavelength within the range of 400 nm to 700 nm, at each angle of incidence from 0 degrees to 30 degrees). The absorbance of the aperture structure 14 can be determined based on the measured reflection and transmittance values according to the formula: Absorbance (%)=100%−Transmittance (%)−Reflectance (%). Transmittance and reflectance values can be determined using an optical spectrometer, such as a Cary-7000 Universal Measurement Spectrophotometer from Agilent Technologies, Inc. The reflectance and transmittance values are measured by placing the sample in the spectrometer with the aperture structure on the side of the glass substrate facing away from the illumination source such that the illumination travels through the glass substrate before reaching the aperture structure 14. In some aspects, the reflectance of the aperture structure 14 as measured through a glass substrate including the first anti-reflection layer 26, is less than 4%, less than 3%, less than 2%, less than 1%, or less than 0.75% at each wavelength of light within a working optical range of 400 nm to 700 nm, at each angle of incidence from 0 degrees to 30 degrees.

The aperture structure 14 can be configured to appear black to an observer, even when viewed at different incident illumination angles under an illuminant. The color of the aperture structure 14 can be characterized using CIE LAB color coordinates. In some aspects, the aperture structure 14 has a CIE LAB (D65 L*a*b*) lightness value (L*) of less than 30, at each angle of incidence (AOI) in the range from 0 to 60 degrees. In some aspects, the aperture structure 14 has an L* value of less than 25 at each AOI in the range from 0 to 50 degrees, less than 15 at each AOI in the range from 0 to 40 degrees, or less than 5 at each AOI in the range from 0 to 30 degrees. In some aspects, the aperture structure 14 has an a* color coordinate value from about 0 to about −2 and a b* color coordinate value from about −1 to about 5, at each AOI in the range of 0 to 60 degrees. In some aspects, the aperture structure 14 has an a* color coordinate value from about 0 to about 1.5 at each AOI in the range from 0 to 40 degrees, about 0 to about 1.25 at each AOI in the range from 0 to 30 degrees, about 0 to about 1 at each AOI in the range from 0 to 20 degrees, or about 0 to about 1 at each AOI in the range from 0 to 10 degrees in combination with at least one b* color coordinate value from about −1 to about 5 at each AOI in the range from 0 to 50 degrees, about −1 to about 4 at each AOI in the range from 0 to 40 degrees, about −1 to about 3 at each AOI in the range from 0 to 30 degrees, about −1 to about 1 at each AOI in the range from 0 to 20 degrees, or about −1 to about 0 at each AOI in the range from 0 to 10 degrees. In some aspects, any of these combinations of a* and b* color coordinate values can be combined with an L* value of less than 30 at each AOI in the range from 0 to 60 degrees, less than 25 at each AOI in the range from 0 to 50 degrees, less than 15 at each AOI in the range from 0 to 40 degrees, or less than 5 at each AOI in the range from 0 to 30 degrees. The procedures for determining color space in the CIE system are described in further detail in ASTM International standard ASTM E308-08, entitled "Standard Practice for Computing the Colors of Objects by Using the CIE System."

The color coordinates a* and b* and lightness value L* for the materials of the present disclosure were measured using a UV/Vis/NIR spectrophotometer configured with an integrating sphere. The measurement was carried out over a wavelength of 380 nm to 770 nm with a 2 nm interval with a D65 series illuminant (representing natural daylight) at the indicated incident angles. Other working optical ranges and illuminants can also be employed to determine the refractive index of a material with any necessary scaling.

The components of the aperture structure 14 can be deposited using a variety of methods including physical vapor deposition ("PVD"), electron beam deposition ("e-beam" or "EB"), ion-assisted deposition-EB ("IAD-EB"), laser ablation, vacuum arc deposition, sputtering, chemical vapor deposition (CVD), plasma enhanced chemical vapor deposition (PECVD), and other similar deposition techniques. In some aspects, the aperture structure may be deposited on a substrate wafer to form a pattern of aperture structures that can be separated to form individual optical windows. Examples of suitable methods for forming aperture structure patterns include additive processes, such as a lift-off process, and subtractive processes, such as a reactive ion etching (RIE) process.

EXAMPLES

The following examples describe various features and advantages provided by aspects of the disclosure, and are in no way intended to limit the invention and appended claims.

Example 1

Figure 4:
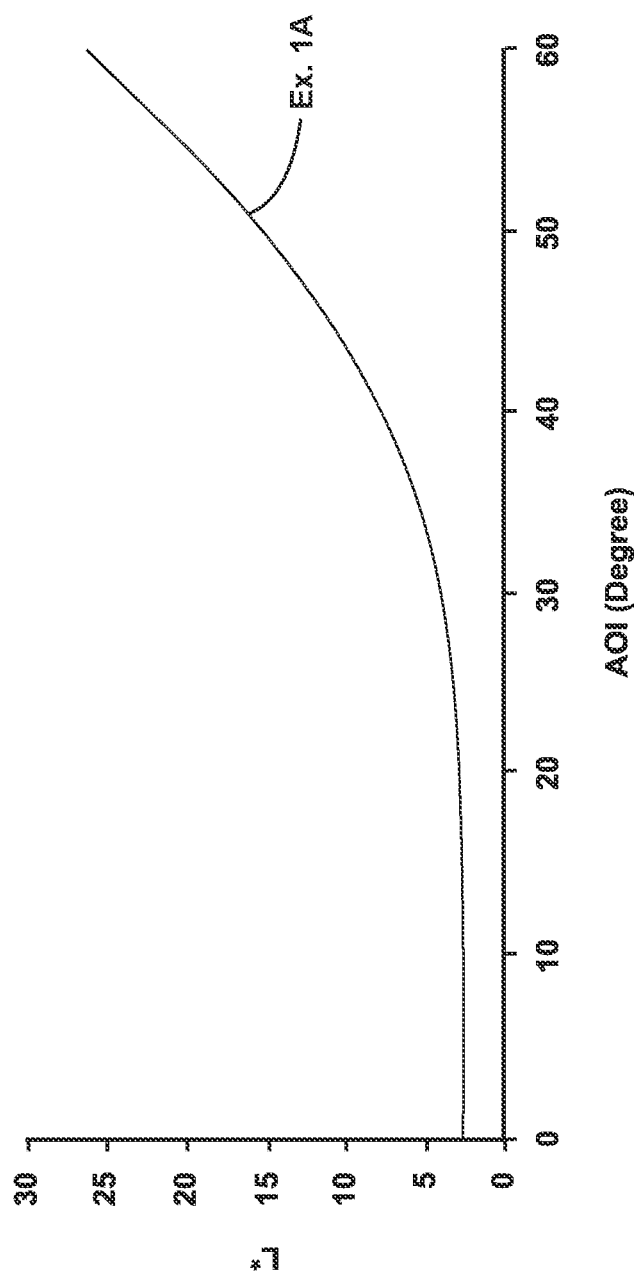
FIG. 4 is a plot of CIE LAB color space lightness value L* as a function of angle of incidence (AOI) for an aperture structure, according to an aspect of the present disclosure.
Figure 5:
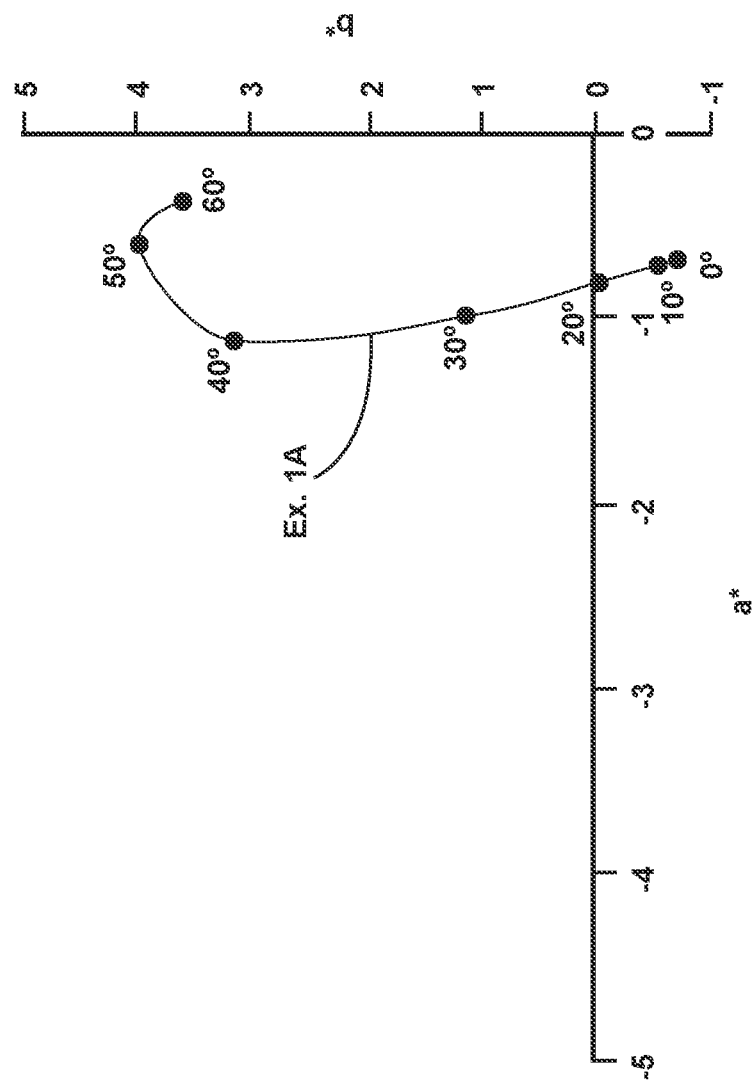
FIG. 5 is a plot of CIE LAB color space color values a* and b* as a function of angle of incidence (AOI) for an aperture structure, according to an aspect of the present disclosure.

FIGS. 4 and 5 illustrate the black color of an example aperture structure of the present disclosure. FIG. 4 is a plot illustrating the lightness L* value and FIG. 5 is a plot illustrating the a* and b* color coordinates of an example aperture structure, Example 1A, according to the present disclosure over a range of angles of incidence (AOI) from 0 to 60 degrees. The aperture structure of Example 1 A was deposited on a glass substrate having an exterior anti-reflection layer disposed over the side of the glass substrate opposite the aperture structure. The aperture structure included $Ta_2O_5$ as an optical cavity layer, Inconel 600 as a light absorbing layer, and chromium as a blocking layer. A second, interior anti-reflection layer, having the same sublayers as the exterior anti-reflection layer, was disposed over the aperture structure. The L*, a*, and b* values were measured by directing the illumination through the exterior anti-reflection layer and the glass substrate. The sample was illuminated with a D65 series illuminant (representing natural daylight) over a working optical range of 380 nm to 770 nm at 2 nm intervals for incident angles from 0 to 60 degrees. Table 1 below summarizes the components of Example 1A. The ordering of layers in the sample is as listed in Table 1, where materials in consecutive rows are in direct contact with each other.

The aperture structure was made using ion beam assisted electron beam evaporation in which an $Ar/O_2$ ion beam was used to compact the optical cavity layer ($Ta_2O_5$). The light absorbing and blocking layers were formed using electron beam evaporation without ion beam bombardment. The anti-reflection layer can be deposited according to any conventional process. The substrate was a 1.1 mm thick, 200 mm outer diameter borosilicate wafer and 12 wafers were deposited in each run. Table 1 lists the actual thickness of each layer in the sample used to obtain the data shown in FIGS. 4 and 5. The thickness of each layer can vary depending on the processing chamber and processing parameters and thus Table 1 also lists a thickness range for each layer based on modeling using a well-defined calibration standard that is expected to demonstrate similar results.

TABLE 1

Components of Example 1A

| Structure | Layer | Actual Thickness | Modeled Thickness Range |
| --- | --- | --- | --- |
| Exterior Anti-reflection layer | $MgF_2$ | 82 nm | 60-80 nm |
| | $ZrO_2$ | 34 nm | 30-50 nm |
| | $Ta_2O_5$ | 99 nm | 70-90 nm |
| | $SiO_2$ | 36 nm | 20-40 nm |
| | $Ta_2O_5$ | 11 nm | 10-30 nm |
| Substrate | borosilicate glass | 1.1 mm | — |
| Aperture Structure | $Ta_2O_5$ | 40 nm | 40-70 nm |
| | Inconel 600 | 12 nm | 3-10 nm |
| | $Ta_2O_5$ | 48 nm | 50-70 nm |
| | Inconel 600 | 28 nm | 8-20 nm |
| | $Ta_2O_5$ | 126 nm | 50-70 nm |
| | Inconel 600 | 30 nm | 10-30 nm |
| | Chromium | 50 nm | 30-60 nm |
| Interior Anti-reflection layer | $Ta_2O_5$ | 11 nm | 10-30 nm |
| | $SiO_2$ | 36 nm | 20-40 nm |
| | $Ta_2O_5$ | 99 nm | 70-90 nm |
| | $ZrO_2$ | 34 nm | 30-50 nm |
| | $MgF_2$ | 82 nm | 60-80 nm |

As illustrated in FIG. 4, the lightness value L* for Example 1A (Ex. 1A) is less than 30 over a wide range of angles of incidence up to 60 degrees. An L* value of 0 in CIELAB color space represents the darkest black and an L* value of 100 is indicative of the brightest white. The results of FIG. 4 demonstrate that the aperture structure of the present disclosure will appear black over a wide range of angles of incidence and can exhibit an L* value of less than 5 at angles of incidence up to at least 30 degrees.

As illustrated in FIG. 5, the a* and b* values for Example 1A (Ex. 1A) are close to 0 over a wide range of angles of incidence up to 60 degrees. The a* axis in color space is representative of the green-red color component, with negative a* values corresponding to green and positive a* values corresponding to red. The b* axis in color space is representative of the blue-yellow component, with negative b* values corresponding to blue and positive b* values corresponding to yellow. The closer the a* and b* values are to the origin, the more neutral in color the aperture structure will appear to an observer. The neutral color in combination with a low L* value can contribute to the black appearance of the aperture structure of the present disclosure.

Example 2

Figure 6:
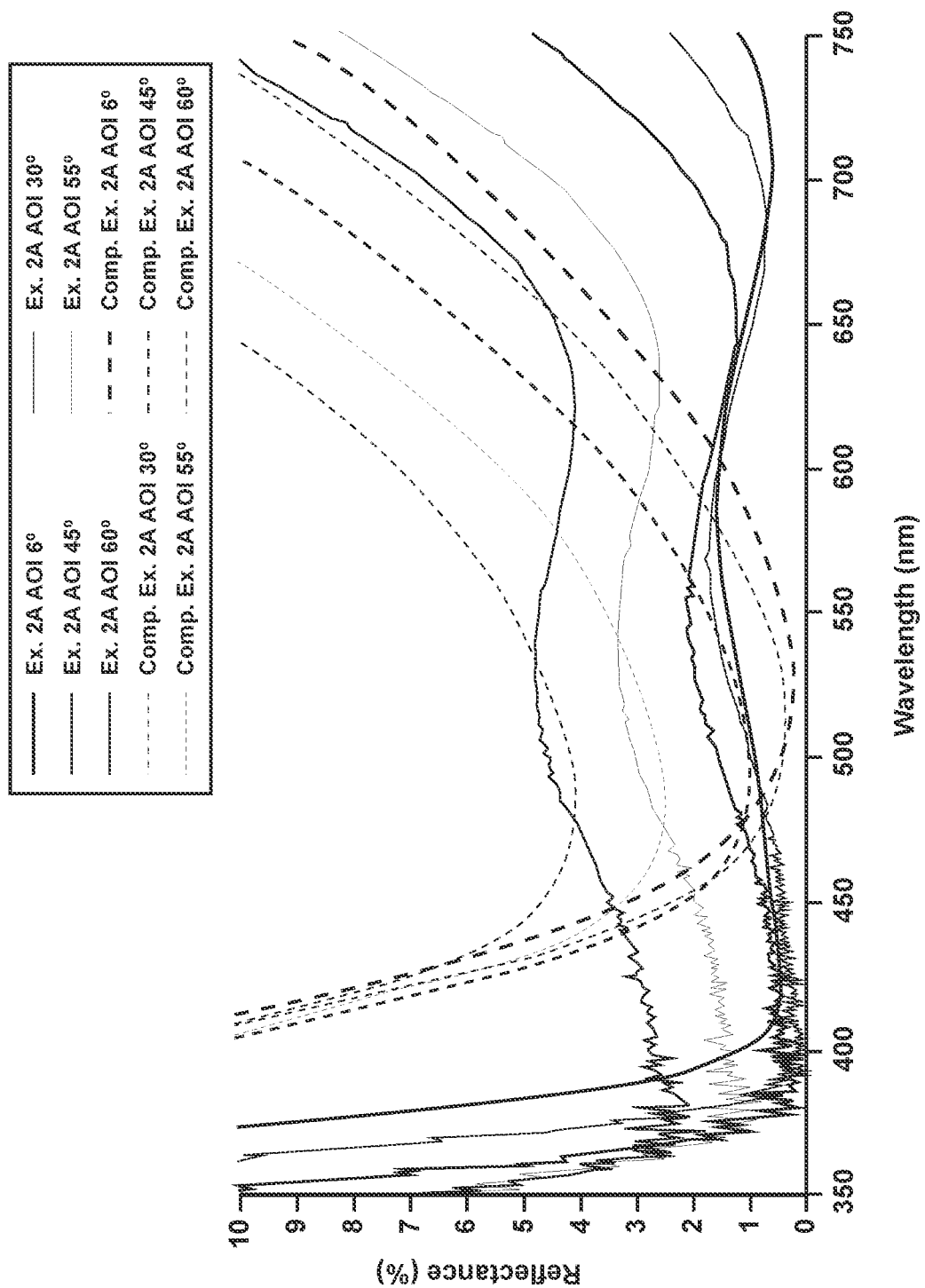
FIG. 6 is a plot of percent reflectance as a function of wavelength for an example of an aperture structure according to an aspect of the present disclosure and a comparative example at viewing angles of incidence (AOI) of 6 degrees (6°), 30 degrees (30°), 45 degrees (45°), 55 degrees (55°), and 60 degrees (60°)

FIG. 6 compares the reflectance properties of an example aperture structure Example 2A ("Ex. 2A") and a Comparative Example 2A ("Comp. Ex. 2A") at different angles of incidence for a wavelength range of about 350 nm to about 750 nm. Example 2A and Comparative Example 2A are similar, except for the content of the aperture structure. Comparative Example 2A was prepared by depositing an aperture structure on a first side of a borosilicate glass substrate, an interior anti-reflection layer over the aperture structure, and an exterior anti-reflection layer on a second side of the glass substrate, opposite the aperture structure layer. Reflectance was measured using a Perkin-Elmer Lambda 950 UV/Vis Spectrophotometer, as described above, by directing the illumination through the exterior anti-reflection layer and the glass substrate at different incident angles: 6 degrees ("AOI 6°"), 30 degrees ("AOI 30°"), 45 degrees ("AOI 45°"), 55 degrees ("AOI 55°"), and 60 degrees ("AOI 60°"). Table 2 below summarizes the components of Example 2A. Comparative Example 2A included the same substrate and anti-reflection layers as Example 2A, and differed only in the content of the aperture structure, which is summarized in Table 3 below. The ordering of layers in Example 2A and Comparative Example 2A is as listed in Tables 2 and 3, respectively, where materials in consecutive rows are in direct contact with each other.

The aperture structure of Example 2A was made in the same way as described above with respect to Example 1A of Example 1 using ion beam assisted electron beam evaporation in which an $Ar/O_2$ ion beam was used to compact the optical cavity layer ($Ta_2O_5$). The light absorbing and blocking layers of Example 2A and the metal and metal oxide layers of Comparative Example 2A were formed using electron beam evaporation without ion beam bombardment. The chromium oxide of Comparative Example 2A is an oxygen deficient chromium oxide $CrO_x$, where 0<x≤2. The anti-reflection layers can be deposited according to any conventional process. The substrate was a 1.1 mm thick, 200 mm outer diameter borosilicate wafer and 12 wafers were deposited in each run. Tables 2 and 3 list the actual thickness of each layer in Example 2A and Comparative Example 2A used to obtain the data shown in FIG. 6 and a thickness range for each layer in Example 2A and Comparative Example 2A based on modeling using a well-defined calibration standard that is expected to demonstrate similar results.

TABLE 2

Components of Example 2A

| Structure | Layer | Actual Thickness | Modeled Thickness Range |
|---|---|---|---|
| Exterior Anti-reflection layer | MgF$_2$ | 68 nm | — |
| | Al$_2$O$_3$ | 41 nm | — |
| | Ta$_2$O$_5$ | 113 nm | — |
| | SiO$_2$ | 35 nm | — |
| | Ta$_2$O$_5$ | 13 nm | — |
| Substrate | borosilicate glass | 1.1 mm | — |
| Aperture Structure | Ta$_2$O$_5$ | 40 | 50-70 nm |
| | Inconel 600 | 12 | 3-10 nm |
| | Ta$_2$O$_5$ | 48 | 50-70 nm |
| | Inconel 600 | 28 | 8-20 nm |
| | Ta$_2$O$_5$ | 126 | 50-70 nm |
| | Inconel 600 | 30 | 10-30 nm |
| | Chromium | 50 nm | 30-100 nm |
| Interior Anti-reflection layer | Ta$_2$O$_5$ | 13 | — |
| | SiO$_2$ | 35 | — |
| | Ta$_2$O$_5$ | 113 | — |
| | Al$_2$O$_3$ | 41 | — |
| | MgF$_2$ | 68 | — |

TABLE 3

Aperture Structure of Comparative Example 2A

| | Layer | Actual Thickness | Modeled Thickness Range |
|---|---|---|---|
| Comparative Example 2A Aperture Structure | Chromium | 6 nm | 3-10 nm |
| | Chromium oxide | 42 nm | 60-120 nm |
| | Chromium | 105 nm | 30-100 nm |

As shown in FIG. 6, Example 2A has a low reflectance (reflectance<5%) over a broader wavelength range at all measured incident angles compared to Comparative Example 2A. In addition, Example 2A demonstrates a lower reflectance compared to Comparative Example 2A at wavelengths less than 450 nm and greater than 550 nm at all measured incident angles.

Example 3

Figure 7:
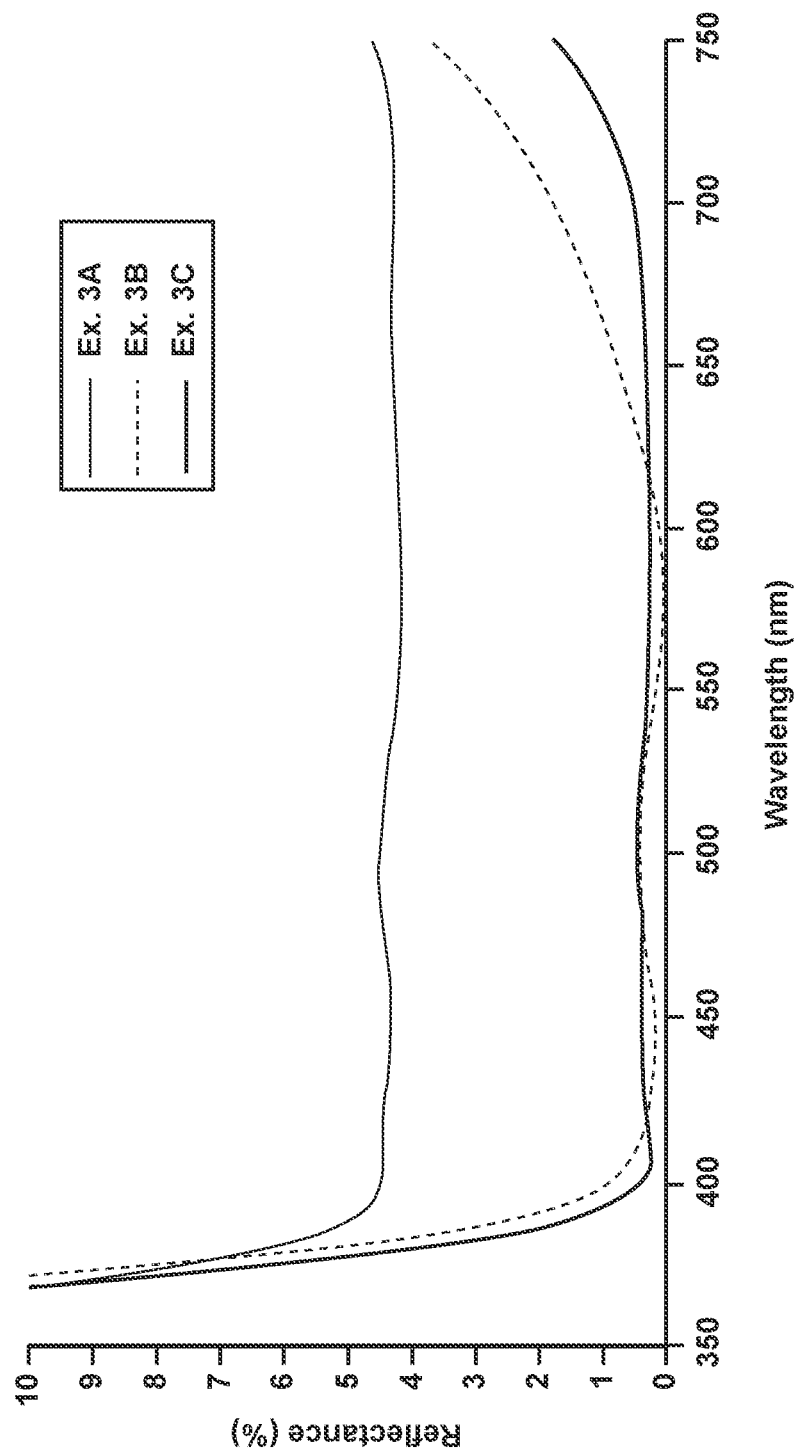
FIG. 7 is a plot of percent reflectance as a function of wavelength for an example optical window having an aperture structure according to the present disclosure without an anti-reflection layer on an exterior side of the optical window (Ex. 3A) and with an anti-reflection layer on an interior and exterior side of the optical window (Exs. 3B and 3C) at an angle of incidence (AOI) of 0 degrees.

FIG. 7 compares the reflectance properties of different optical windows including an aperture structure according to the present disclosure. Example 3A (Ex. 3A) includes the same substrate, aperture structure, and interior anti-reflection layer as Example 2A, but does not include an exterior anti-reflection layer. Example 3B (Ex. 3B) includes the same substrate and aperture structure as Example 2A, but includes a different exterior anti-reflection layer, shown in Table 4 below. Example 3C has the same structure as Example 2A. The reflectance was measured using a Perkin-Elmer Lambda 950 UV/Vis Spectrophotometer as described above by directing the illumination through the exterior anti-reflection layer and the glass substrate at an incident angle of 0 degrees. The aperture structures were made in the same manner as described above for Example 2A of Example 2. Table 4 lists the actual thickness of each layer in the sample used to obtain the data shown in FIG. 7 and a thickness range for each layer based on modeling using a well-defined calibration standard that is expected to demonstrate similar results.

TABLE 4

Anti-Reflection Layer of Example 3B

| Structure | Layer | Actual Thickness | Modeled Thickness Range |
|---|---|---|---|
| Exterior Anti-reflection layer | MgF$_2$ | 94 nm | 70-100 nm |
| | HfO$_2$ | 134 nm | 80-140 nm |
| | SiO$_2$ | 36 nm | 20-50 nm |
| | HfO$_2$ | 15 nm | 30-70 nm |
| Substrate | borosilicate glass | 1.1 mm | — |
| Aperture Structure | TiO$_2$ | 42 nm | 50-70 nm |
| | Inconel 600 | 15 nm | 3-10 nm |
| | TiO$_2$ | 45 nm | 50-70 nm |
| | Inconel 600 | 28 nm | 8-20 nm |
| | TiO$_2$ | 126 nm | 50-70 nm |
| | Inconel 600 | 30 nm | 10-30 nm |
| | Chromium | 50 nm | 30-100 nm |

FIG. 7 illustrates the effect of the combination of an exterior anti-reflection layer and an aperture structure in an optical window according to an aspect of the present disclosure. Example 3A illustrates the low reflectance (<5%) of the aperture structure when used on a glass substrate in combination with only an interior anti-reflection layer, across a range of wavelengths from at least 400 nm to at least 750 nm. Examples 3B and 3C show that the reflectance of the aperture structure of the present disclosure can be decreased even further, down to less than 1% for wavelengths from at least 400 nm to at least 650 nm in the case of Example 3B and up to at least 700 nm in the case of Example 3C when used in an optical window that includes both an interior anti-reflection layer and an exterior anti-reflection layer.

Example 4

Tables 5 and 6 below summarize the components of exemplary optical windows, Examples 4A and 4B, which include aperture structures according to the present disclosure. The aperture structures can be made in a manner similar to that described above in Example 1. The aperture structures of Examples 4A and 4B can be used with any of the exterior and/or interior anti-reflection layers described herein.

TABLE 5

Components of Example 4A

| Structure | Layer | Actual Thickness |
|---|---|---|
| Exterior Anti-reflection layer | MgF$_2$ | 82.31 nm |
| | ZrO$_2$ | 33.98 nm |
| | Ta$_2$O$_5$ | 99.19 nm |
| | SiO$_2$ | 30.35 nm |
| | Ta$_2$O$_5$ | 14.22 nm |
| Substrate | borosilicate glass | 1.1 mm |
| Aperture Structure | Ta$_2$O$_5$ | 40.75 nm |
| | Inconel 600 | 11.66 nm |
| | Ta$_2$O$_5$ | 48.63 nm |
| | Inconel 600 | 21.13 nm |
| | Ta$_2$O$_5$ | 127.22 nm |
| | Inconel 600 | 40.47 nm |

TABLE 6

Components of Example 4B

| Structure | Layer | Actual Thickness |
|---|---|---|
| Exterior | MgF$_2$ | 82.31 nm |
| Anti-reflection layer | ZrO$_2$ | 33.98 nm |
| | Ta$_2$O$_5$ | 99.19 nm |
| | SiO$_2$ | 30.35 nm |
| | Ta$_2$O$_5$ | 14.22 nm |
| Substrate | borosilicate glass | 1.1 mm |
| Aperture Structure | Ta$_2$O$_5$ | 40.75 nm |
| | Inconel 600 | 11.66 nm |
| | Ta$_2$O$_5$ | 48.63 nm |
| | Inconel 600 | 21.13 nm |
| | Ta$_2$O$_5$ | 127.22 nm |
| | Inconel 600 | 20 nm |
| | Chromium | 50 nm |

The aperture structure of Example 4A is a 6 layer aperture structure that includes a nickel-chromium metal alloy layer (Inconel 600) as the last layer (i.e., the layer furthest from the glass substrate). This last layer of the Inconel 600 nickel-chromium metal alloy can be thicker than the previous Inconel 600 layers in the optical stack to increase the optical density of the aperture structure and reduce the reflectance such that the last Inconel 600 nickel-chromium metal alloy layer of Example 4A acts as both the last light absorbing layer and the blocking layer. The aperture structure of Example 4B is a 7 layer aperture structure that is similar to Example 4A except that a thickness of the last Inconel 600 nickel-chromium metal alloy layer is reduced and a chromium metal layer is disposed over the last Inconel 600 nickel-chromium metal alloy layer, with the chromium metal layer acting as the blocking layer. Inconel can be challenging to pattern as the thickness of the Inconel material increases and thus, depending on the desired optical density of the aperture structure, a layer of chromium metal can be provided as the last layer of the aperture structure, i.e., the blocking layer, to increase the optical density of the aperture structure as the thickness of the last Inconel layer is decreased.

The following non-limiting aspects are encompassed by the present disclosure:

According to a first aspect of the present disclosure, an aperture structure for a substrate of an optical device, includes: an optical cavity layer that includes a dielectric material including at least one of a metal oxide, a metal nitride, and a metal oxynitride, the optical cavity layer further including a refractive index of about 1.4 or greater, as measured at a wavelength of 550 nm, a transmittance of at least about 50% for each wavelength of light in a range from 400 nm to 700 nm at each angle of incidence from 0 degrees to 30 degrees, and a thickness of about 10 nm to about 200 nm; a light absorbing layer disposed over the optical cavity layer, the light absorbing layer including a metal or a metal alloy, an extinction coefficient k of at least 1, as measured at a wavelength of 550 nm, and a thickness of about 3 nm to about 60 nm; and a blocking layer disposed over the light absorbing layer, the blocking layer including a metal or a metal alloy, an optical density of at least 3 at each wavelength of light in the range from 400 nm to 700 nm, and a thickness of about 30 nm to about 300 nm, wherein the aperture structure includes a reflectance of less than 5% for each wavelength of light in the range from 400 nm to 700 nm at each angle of incidence from 0 degrees to 30 degrees, as measured through the substrate.

According to the first aspect of the present disclosure, in a second aspect, the optical cavity layer and the light absorbing layer define an optical stack, and wherein the aperture structure includes n number of the optical stack and n is from 1 to 10.

According to the first or second aspect of the present disclosure, in a third aspect, the aperture structure includes an absorbance of 98% or greater at each wavelength of light in the range from 400 nm to 700 nm at each angle of incidence from 0 degrees to 30 degrees, as measured through the substrate.

According to any of the first through the third aspects of the present disclosure, in a fourth aspect, the aperture structure includes a reflectance of less than 2% at each wavelength of light in the range from 400 nm to 700 nm at each angle of incidence from 0 degrees to 30 degrees, as measured through the substrate.

According to any of the first through the fourth aspects of the present disclosure, in a fifth aspect, the aperture structure includes a CIE LAB (D65 L*a*b*) lightness value L* of less than 30 as measured at each angle of incidence (AOI) in the range from 0 to 60 degrees.

According to any of the first through the fifth aspects of the present disclosure, in a sixth aspect, the aperture structure includes a CIE LAB (D65 L*a*b*) a* value from about 0 to about −2 and a CIE LAB (D65 L*a*b*) b* value from about −1 to about 5, as measured at each angle of incidence (AOI) in the range from 0 to 60 degrees.

According to any of the first through the sixth aspects of the present disclosure, in a seventh aspect, the dielectric material of the optical cavity layer includes at least one of SiO$_2$, Al$_2$O$_3$, Nb$_2$O$_5$, TiO$_2$, ZrO$_2$, Ta$_2$O$_5$, Y$_2$O$_3$, Si$_3$N$_4$, SiON, TiO$_x$, SiN$_x$, SiO$_x$N$_y$, and CrO$_x$.

According to any of the first through the seventh aspects of the present disclosure, in an eighth aspect, the light absorbing layer includes at least one of chromium metal, nickel metal, tungsten metal, and a nickel-chromium metal alloy.

According to any of the first through the eighth aspects of the present disclosure, in a ninth aspect, the blocking layer includes at least one of chromium metal, nickel metal, tungsten metal, and a nickel-chromium metal alloy.

According to any of the first through the ninth aspects of the present disclosure, in a tenth aspect: the dielectric material of the optical cavity layer includes Ta$_2$O$_5$; the light absorbing layer includes a nickel-chromium metal alloy; and the blocking layer includes chromium metal, wherein the optical cavity layer and the light absorbing layer define an optical stack, and wherein the aperture structure includes n number of the optical stack and n is from 1 to 10.

According to any of the first through the ninth aspects of the present disclosure, in an eleventh aspect: the dielectric material of the optical cavity layer includes Ta$_2$O$_5$; the light absorbing layer includes a nickel-chromium metal alloy; and the blocking layer includes a nickel-chromium metal alloy, wherein the optical cavity layer and the light absorbing layer define an optical stack, and wherein the aperture structure includes n number of the optical stack and n is from 1 to 10, and wherein the light absorbing layer furthest from the substrate has a sufficient thickness to act as both a light absorbing layer and a blocking layer.

According to the tenth or eleventh aspects of the present disclosure, in a twelfth aspect, n is 3 and further wherein the nickel chromium-metal alloy of the light absorbing layer includes 60% nickel (by weight).

According to a thirteenth aspect of the present disclosure, an optical window, includes: a glass or glass-ceramic substrate having opposing first and second surfaces; an aperture structure disposed over the first surface of the substrate, wherein the aperture structure includes: an optical cavity layer that includes a dielectric material including at least one of a metal oxide, a metal nitride, and a metal oxynitride, the optical cavity layer further including a refractive index of about 1.4 or greater, as measured at a wavelength of 550 nm, a transmittance of at least 50% at each wavelength of light in a range from 400 nm to 700 nm at each angle of incidence from 0 degrees to 30 degrees, and a thickness of about 10 nm to about 200 nm; a light absorbing layer disposed over the optical cavity layer, the light absorbing layer including a metal or a metal alloy, an extinction coefficient k of at least 1, as measured at a wavelength of 550 nm, and a thickness of about 3 nm to about 60 nm; and a blocking layer disposed over the light absorbing layer, the blocking layer including a metal or a metal alloy, an optical density of at least 3 at each wavelength of light in the range from 400 nm to 700 nm, and a thickness of about 30 nm to about 300 nm, wherein the aperture structure includes a reflectance of less than 5% for each wavelength of light in the range from 400 nm to 700 nm at each angle of incidence from 0 degrees to 30 degrees, as measured through the substrate.

According to the thirteenth aspect of the present disclosure, in a fourteenth aspect the optical window further includes an adhesive layer disposed over the first surface of the substrate between the optical cavity layer and the first surface, wherein the adhesive layer includes at least one of aluminum oxide, chromium metal, nickel metal, and a nickel-chromium metal alloy.

According to thirteenth or the fourteenth aspects of the present disclosure, in a fifteenth aspect, the optical window further includes an anti-reflection layer disposed over the second surface of the substrate, wherein the anti-reflection layer includes a reflectance of less than 1% for each wavelength of light in the range from 400 nm to 700 nm at each angle of incidence from 0 degrees to 30 degrees.

According to any of the thirteenth through the fifteenth aspects of the present disclosure, in a sixteenth aspect, the anti-reflection layer includes at least one of magnesium fluoride, tantalum pentoxide, zirconium oxide, aluminum trioxide, silicon dioxide, and combinations thereof.

According to any of the thirteenth through the sixteenth aspects of the present disclosure, in a seventeenth aspect, glass or glass ceramic substrate includes fused silica, quartz, synthetic sapphire, chemically strengthened glass, alkali aluminosilicate glass, germanium glass, alkaline earth boro-aluminosilicate glass, alkali borosilicate glass, calcium fluoride glass, and magnesium fluoride glass.

According to any of the thirteenth through the seventeenth aspects of the present disclosure, in an eighteenth aspect, the optical cavity layer and the light absorbing layer define an optical stack, and wherein the aperture structure includes n number of the optical stack disposed between the first surface and the blocking layer, and n is from 1 to 10.

According to any of the thirteenth through the eighteenth aspects of the present disclosure, in a nineteenth aspect, the aperture structure includes an absorbance of 98% or greater for each wavelength of light in the range from 400 nm to 700 nm at each angle of incidence from 0 degrees to 30 degrees, as measured through the substrate.

According to any of the thirteenth through the nineteenth aspects of the present disclosure, in a twentieth aspect, the aperture structure includes a reflectance of less than 2% for each wavelength of light in the range from 400 nm to 700 nm at each angle of incidence from 0 degrees to 30 degrees, as measured through the substrate.

According to any of the thirteenth through the twentieth aspects of the present disclosure, in a twenty-first aspect, the aperture structure includes at least one of: a CIE LAB (D65 L*a*b*) lightness value L* of less than 30 as measured at each angle of incidence (AOI) in the range from 0 to 60 degrees; and a CIE LAB (D65 L*a*b*) a* value from about 0 to about −2 and a b* value from about −1 to about 5, as measured at each angle of incidence (AOI) in the range from 0 to 60 degrees.

According to any of the thirteenth through the twenty-first aspects of the present disclosure, in a twenty-second aspect, the dielectric material of the optical cavity layer includes at least one of $SiO_2$, $Al_2O_3$, $Nb_2O_5$, $TiO_2$, $ZrO_2$, $Ta_2O_5$, $Y_2O_3$, $Si_3N_4$, SiON, $TiO_x$, $SiN_x$, $SiO_xN_y$, and $CrO_x$.

According to any of the thirteenth through the twenty-second aspects of the present disclosure, in a twenty-third aspect, the light absorbing layer includes at least one of chromium metal, nickel metal, tungsten metal, and a nickel-chromium metal alloy.

According to any of the thirteenth through the twenty-third aspects of the present disclosure, in a twenty-fourth aspect, the blocking layer includes at least one of chromium metal, nickel metal, tungsten metal, and a nickel-chromium metal alloy.

According to any of the thirteenth through the twenty-fourth aspects of the present disclosure, in a twenty-fifth aspect, the dielectric material of the optical cavity layer includes $Ta_2O_5$; the light absorbing layer includes a nickel-chromium metal alloy; and the blocking layer includes chromium metal, wherein the optical cavity layer and the light absorbing layer define an optical stack, and wherein the aperture structure includes n number of the optical stack and n is from 1 to 10.

According to any of the thirteenth through the twenty-fourth aspects of the present disclosure, in a twenty-sixth aspect, the dielectric material of the optical cavity layer includes $Ta_2O_5$; the light absorbing layer includes a nickel-chromium metal alloy; and the blocking layer includes a nickel-chromium metal alloy, wherein the optical cavity layer and the light absorbing layer define an optical stack, and wherein the aperture structure includes n number of the optical stack and n is from 1 to 10, and wherein the light absorbing layer furthest from the substrate has a sufficient thickness to act as both a light absorbing layer and a blocking layer.

According to the twenty-fifth or the twenty-sixth aspects of the present disclosure, in a twenty-seventh aspect, n is 3 and further wherein the nickel chromium-metal alloy of the light absorbing layer includes 60% nickel (by weight).

According to a twenty-eighth aspect of the present disclosure, an optical device includes an optical window including a glass or glass-ceramic substrate having opposing first and second surfaces; an aperture structure disposed over the first surface of the substrate, wherein the aperture structure includes: an optical cavity layer that includes a dielectric material including at least one of a metal oxide, a metal nitride, and a metal oxynitride, the optical cavity layer further including a refractive index of about 1.4 or greater, as measured at a wavelength of 550 nm, a transmittance of at least 50% at each wavelength of light in a range from 400 nm to 700 nm at angles of incidence from 0 degrees to 30 degrees, and a thickness of about 10 nm to about 200 nm; a light absorbing layer disposed over the optical cavity layer, the light absorbing layer including a metal or a metal alloy, an extinction coefficient of at least 1, as measured at a wavelength of 550 nm, and a thickness of about 3 nm to about 60 nm; and a blocking layer disposed over the light absorbing layer, the blocking layer including a metal or a metal alloy, an optical density of at least 3 at each wavelength of light in the range from 400 nm to 700 nm, and a thickness of about 30 nm to about 300 nm, wherein the aperture structure includes a reflectance of less than 5% for each wavelength of light in the range from 400 nm to 700 nm at each angle of incidence from 0 degrees to 30 degrees, as measured through the substrate; and a semiconductor disposed over the optical window and the aperture structure, wherein the optical window and the semiconductor define a cavity.

According to the twenty-eighth aspect of the present disclosure, in a twenty-ninth aspect, an anti-reflection layer is disposed over at least one of the first surface of the substrate, the aperture structure, and the second surface of the substrate, wherein the anti-reflection layer includes a reflectance of less than 1% at each wavelength of light in the range from 400 nm to 700 nm at each angle of incidence from 0 degrees to 30 degrees.

According to the twenty-eighth or the twenty-ninth aspects of the present disclosure, in a thirtieth aspect, the optical cavity layer and the light absorbing layer define an optical stack, and wherein the aperture structure includes n number of the optical stack disposed between the first surface and the blocking layer, and n is from 1 to 10.

According to any of the twenty-eighth through the thirtieth aspects of the present disclosure, in a thirty-first aspect, the aperture structure includes an absorbance of 98% or greater at each wavelength of light in the range from 400 nm to 700 nm at each angle of incidence from 0 degrees to 30 degrees, as measured through the substrate.

According to any of the twenty-eighth through the thirty-first aspects of the present disclosure, in a thirty-second aspect, the aperture structure includes at least one of: a CIE LAB (D65 L*a*b*) lightness value L* of less than 30 as measured at each angle of incidence (AOI) in the range from 0 to 60 degrees; and a CIE LAB (D65 L*a*b*) a* value from about 0 to about −2 and a b* value from about −1 to about 5, as measured at each angle of incidence (AOI) in the range from 0 to 60 degrees.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. An aperture structure for a substrate of an optical device, comprising:
   an optical cavity layer that comprises a dielectric material comprising at least one of a metal oxide, a metal nitride, and a metal oxynitride, the optical cavity layer further comprising a refractive index of about 1.4 or greater, as measured at a wavelength of 550 nm; a transmittance of at least about 50% for each wavelength of light in the range from 400 nm to 700 nm at each angle of incidence from 0 degrees to 30 degrees; and a thickness of about 10 nm to about 200 nm;
   a light absorbing layer disposed over the optical cavity layer, the light absorbing layer comprising a metal or a metal alloy; an extinction coefficient k of at least 1, as measured at a wavelength of 550 nm; and a thickness of about 3 nm to about 60 nm; and
   a blocking layer disposed over the light absorbing layer, the blocking layer comprising a metal or a metal alloy; an optical density of at least 3 at each wavelength of light in the range from 400 nm to 700 nm; and a thickness of about 30 nm to about 300 nm;
   wherein the aperture structure comprises a reflectance of less than 5% for each wavelength of light in the range from 400 nm to 700 nm at each angle of incidence from 0 degrees to 30 degrees, as measured through the substrate.

2. The aperture structure of claim 1, wherein the optical cavity layer and the light absorbing layer define an optical stack, and wherein the aperture structure comprises n number of the optical stack and n is from 1 to 10.

3. The aperture structure of claim 1, wherein the aperture structure comprises an absorbance of 98% or greater at each wavelength of light in the range from 400 nm to 700 nm at each angle of incidence from 0 degrees to 30 degrees, as measured through the substrate.

4. The aperture structure of claim 1, wherein the aperture structure comprises at least one of:
   a CIE LAB (D65 L*a*b*) lightness value L* of less than 30 as measured at each angle of incidence (AOI) in the range from 0 to 60 degrees; and
   a CIE LAB (D65 L*a*b*) a* value from about 0 to about −2 and a CIE LAB (D65 L*a*b*) b* value from about −1 to about 5, as measured at each angle of incidence (AOI) in the range from 0 to 60 degrees.

5. The aperture structure of claim 1, wherein the dielectric material of the optical cavity layer comprises at least one of $SiO_2$, $Al_2O_3$, $Nb_2O_5$, $TiO_2$, $ZrO_2$, $Ta_2O_5$, $Y_2O_3$, $Si_3N_4$, SiON, $TiO_x$, $SiN_x$, $SiO_xN_y$, and $CrO_x$.

6. The aperture structure of claim 1, wherein the light absorbing layer comprises at least one of chromium metal, nickel metal, tungsten metal, and a nickel-chromium metal alloy.

7. The aperture structure of claim 1, wherein the blocking layer comprises at least one of chromium metal, nickel metal, tungsten metal, and a nickel-chromium metal alloy.

8. An optical window, comprising:
   a glass or glass-ceramic substrate having opposing first and second surfaces;
   an aperture structure disposed over the first surface of the substrate, wherein the aperture structure comprises:
      an optical cavity layer that comprises a dielectric material comprising at least one of a metal oxide, a metal nitride, and a metal oxynitride, the optical cavity layer further comprising a refractive index of about 1.4 or greater, as measured at a wavelength of 550 nm, a transmittance of at least 50% to for each wavelength of light in the range from 400 nm to 700 nm at each angle of incidence from 0 degrees to 30 degrees, and a thickness of about 10 nm to about 200 nm;
      a light absorbing layer disposed over the optical cavity layer, the light absorbing layer comprising a metal or a metal alloy; an extinction coefficient k of at least 1, as measured at a wavelength of 550 nm; and a thickness of about 3 nm to about 60 nm; and
      a blocking layer disposed over the light absorbing layer, the blocking layer comprising a metal or a metal alloy; an optical density of at least 3 for each wavelength of light in the range from 400 nm to 700 nm; and a thickness of about 30 nm to about 300 nm,
   wherein the aperture structure comprises a reflectance of less than 5% for each wavelength of light in the range from 400 nm to 700 nm at each angle of incidence from 0 degrees to 30 degrees, as measured through the substrate.

9. The optical window of claim 8, further comprising:
   an anti-reflection layer disposed over the second surface of the substrate, wherein the anti-reflection layer comprises a reflectance of less than 1% for each wavelength of light in the range from 400 nm to 700 nm at each angle of incidence from 0 degrees to 30 degrees.

10. The optical window of claim 8, wherein the optical cavity layer and the light absorbing layer define an optical stack, and wherein the aperture structure comprises n number of the optical stack disposed between the first surface and the blocking layer, and n is from 1 to 10.

11. The optical window of claim 8, wherein the aperture structure comprises an absorbance of 98% or greater for each wavelength of light in the range from 400 nm to 700 nm at each angle of incidence from 0 degrees to 30 degrees, as measured through the substrate.

12. The optical window of claim 8, wherein the aperture structure comprises at least one of:
- a CIE LAB (D65 L*a*b*) lightness value L* of less than 30 as measured at each angle of incidence (AOI) in the range from 0 to 60 degrees; and
- a CIE LAB (D65 L*a*b*) a* value from about 0 to about −2 and a b* value from about −1 to about 5, as measured at each angle of incidence (AOI) in the range from 0 to 60 degrees.

13. The optical window claim 8, wherein the dielectric material of the optical cavity layer comprises at least one of $SiO_2$, $Al_2O_3$, $Nb_2O_5$, $TiO_2$, $ZrO_2$, $Ta_2O_5$, $Y_2O_3$, $Si_3N_4$, SiON, $TiO_x$, $SiN_x$, $SiO_xN_y$, and $CrO_x$.

14. The optical window of claim 8, wherein the light absorbing layer comprises at least one of chromium metal, nickel metal, tungsten metal, and a nickel-chromium metal alloy.

15. The optical window of claim 8, wherein the blocking layer comprises at least one of chromium metal, nickel metal, tungsten metal, and a nickel-chromium metal alloy.

16. An optical device, comprising:
- an optical window comprising a glass or glass-ceramic substrate having opposing first and second surfaces;
- an aperture structure disposed over the first surface of the substrate, wherein the aperture structure comprises:
  - an optical cavity layer that comprises a dielectric material comprising at least one of a metal oxide, a metal nitride, and a metal oxynitride, the optical cavity layer further comprising a refractive index of about 1.4 or greater, as measured at a wavelength of 550 nm; a transmittance of at least 50% for each wavelength of light in the range from 400 nm to 700 nm at each angle of incidence from 0 degrees to 30 degrees; and a thickness of about 10 nm to about 200 nm;
  - a light absorbing layer disposed over the optical cavity layer, the light absorbing layer comprising a metal or a metal alloy; an extinction coefficient of at least 1, as measured at a wavelength of 550 nm; and a thickness of about 3 nm to about 60 nm; and
  - a blocking layer disposed over the light absorbing layer, the blocking layer comprising a metal or a metal alloy; an optical density of at least 3 at each wavelength of light in the range from 400 nm to 700 nm; and a thickness of about 30 nm to about 300 nm;
  - wherein the aperture structure comprises a reflectance of less than 5% for each wavelength of light in the range from 400 nm to 700 nm at each angle of incidence from 0 degrees to 30 degrees, as measured through the substrate; and
- a semiconductor disposed over the optical window and the aperture structure, wherein the optical window and the semiconductor define a cavity.

17. The optical device of claim 16, further comprising:
- an anti-reflection layer disposed over at least one of the first surface of the substrate, the aperture structure, and the second surface of the substrate,
- wherein the anti-reflection layer includes a reflectance of less than 1% at each wavelength of light in the range from 400 nm to 700 nm.

18. The optical device of claim 16, wherein the optical cavity layer and the light absorbing layer define an optical stack, and wherein the aperture structure comprises n number of the optical stack disposed between the first surface and the blocking layer, and n is from 1 to 10.

19. The optical device of claim 16, wherein the aperture structure comprises an absorbance of 98% or greater at each wavelength of light in the range from 400 nm to 700 nm at angles of incidence from 0 degrees to 30 degrees, as measured through the substrate.

20. The optical device of claim 16, wherein the aperture structure comprises at least one of:
- a CIE LAB (D65 L*a*b*) lightness value L* of less than 30 as measured at each angle of incidence (AOI) in the range from 0 to 60 degrees; and
- a CIE LAB (D65 L*a*b*) a* value from about 0 to about −2 and a b* value from about −1 to about 5, as measured at each angle of incidence (AOI) in the range from 0 to 60 degrees.

* * * * *

UNITED STATES PATENT AND TRADEMARK OFFICE
CERTIFICATE OF CORRECTION

PATENT NO. : 11,703,677 B2
APPLICATION NO. : 16/941808
DATED : July 18, 2023
INVENTOR(S) : Xu Ouyang It is certified that error appears in the above-identified patent and that said Letters Patent is hereby corrected as shown below:

In the Claims

In Column 27, Line 23, in Claim 13, after "window" insert -- of --.

Signed and Sealed this
Sixteenth Day of January, 2024

Katherine Kelly Vidal
*Director of the United States Patent and Trademark Office*